US009734956B2

United States Patent
Tang et al.

(10) Patent No.: US 9,734,956 B2
(45) Date of Patent: Aug. 15, 2017

(54) LINKED STACKS OF PARTLY REDUCED GRAPHEN, METHOD FOR PRODUCING LINKED STACKS OF PARTLY REDUCED GRAPHENE, POWER COMPRISING LINKED STACKS OF PARTLY REDUCED GRAPHENE, GRAPHENE ELECTRODE FILM, METHOD FOR PRODUCING GRAPHENE ELCETRODE FILM, AND GRAPHENE CAPACITOR

(71) Applicant: NATIONAL INSTITUTE FOR MATERIALS SCIENCE, Ibaraki (JP)

(72) Inventors: Jie Tang, Ibaraki (JP); Feifei Zhang, Ibaraki (JP); Norio Shinya, Ibaraki (JP); Qian Cheng, Ibaraki (JP); Luchang Qin, Ibaraki (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 203 days.

(21) Appl. No.: 14/425,436

(22) PCT Filed: Sep. 4, 2013

(86) PCT No.: PCT/JP2013/073841
§ 371 (c)(1),
(2) Date: Mar. 3, 2015

(87) PCT Pub. No.: WO2014/038600
PCT Pub. Date: Mar. 13, 2014

(65) Prior Publication Data
US 2015/0248972 A1 Sep. 3, 2015

(30) Foreign Application Priority Data

Sep. 5, 2012 (JP) .................................. 2012-194792
Sep. 5, 2012 (JP) .................................. 2012-194833

(51) Int. Cl.
*H01G 11/36* (2013.01)
*B82Y 30/00* (2011.01)
(Continued)

(52) U.S. Cl.
CPC ............. *H01G 11/36* (2013.01); *B32B 7/045* (2013.01); *B32B 9/007* (2013.01); *B32B 9/04* (2013.01);
(Continued)

(58) Field of Classification Search
CPC ........ H01G 11/36; H01G 11/86; H01G 11/80; C01B 31/0476; C01B 31/0484;
(Continued)

(56) References Cited

U.S. PATENT DOCUMENTS 7,623,340 B1    11/2009  Song et al.
2011/0157772 A1  6/2011  Zhamu et al.
(Continued)

OTHER PUBLICATIONS

Li, Yong-Feng, et al. "Reduced graphene oxide/MWCNT hybrid sandwiched film by self-assembly for high performance supercapacitor electrodes." Applied Physics A 108.3 (2012): 701-707.*
(Continued)

*Primary Examiner* — Richard M Rump
(74) *Attorney, Agent, or Firm* — Wenderoth, Lind & Ponack, L.L.P.

(57) ABSTRACT

The object of the present invention is to provide linked stacks of reduced graphene, in which excellent electrical property on the surface of graphene may be utilized, a method for producing the same, powder comprising the same, and film comprising the same. The object may be solved by using linked stacks of partly reduced graphene 11 comprising two or more stacks of partly reduced graphene 21 to 24 linked together, in which the stack of partly reduced
(Continued)

graphene 21 has two or more sheets of partly reduced graphene 31 and a nanosubstance 32 held between the sheets of partly reduced graphene 31, the partly reduced graphene 31 has no carbonyl groups and has carboxyl groups 31$a$ and hydroxyl groups 31$b$, and different stacks of partly reduced graphene 21 to 24 are linked to each other by an ester bond 34.

30 Claims, 21 Drawing Sheets

(51) Int. Cl.
*B82Y 40/00* (2011.01)
*B32B 9/00* (2006.01)
*B32B 9/04* (2006.01)
*B32B 7/04* (2006.01)
*C01B 31/04* (2006.01)
*H01B 1/04* (2006.01)
*H01B 1/12* (2006.01)
*H01G 11/80* (2013.01)
*H01G 11/86* (2013.01)

(52) U.S. Cl.
CPC .............. *B82Y 30/00* (2013.01); *B82Y 40/00* (2013.01); *C01B 31/0476* (2013.01); *C01B 31/0484* (2013.01); *H01B 1/04* (2013.01); *H01B 1/12* (2013.01); *H01G 11/80* (2013.01); *H01G 11/86* (2013.01); *B32B 2307/202* (2013.01); *B32B 2313/04* (2013.01); *B32B 2457/16* (2013.01); *B32B 2605/00* (2013.01); *C01B 2204/22* (2013.01); *Y02E 60/13* (2013.01); *Y02T 10/7022* (2013.01)

(58) Field of Classification Search
CPC ........ C01B 2204/22; H01B 1/12; H01B 1/04; B32B 7/045; B32B 9/04; B32B 9/007; B32B 2313/04; B32B 2307/202; B32B 2457/16; B32B 2605/00; B82Y 30/00; B82Y 40/00; Y02E 60/50; Y02E 60/01
See application file for complete search history.

(56) References Cited

U.S. PATENT DOCUMENTS

2011/0165321 A1 7/2011 Zhamu et al.
2013/0295374 A1 11/2013 Tang et al.

OTHER PUBLICATIONS

International Search Report issued Dec. 3, 2013 in International (PCT) Application No. PCT/JP2013/073841.
Wang et al., "Preventing Graphene Sheets from Restacking for High-Capacitance Performance", J. Phys. Chem. C., vol. 115, 2011, pp. 23192-23197.
Kim et al., "Influence of multi-walled carbon nanotubes on the electrochemical performance of graphene nanocomposites for supercapacitor electrodes", Electrochimica Actaa, vol. 56, 2011, pp. 1629-1635.
Yang et al., "Design and tailoring of a hierarchical graphene-carbon nanotube architecture for supercapacitors", J. Mater. Chem., vol. 21, 2011, pp. 2374-2380.
Yu et al., "Self-Assembled Graphene/Carbon Nanotube Hybrid Films for Supercapacitors", J. Phys. Chem. Lett., vol. 1, Dec. 22, 2009, pp. 467-470.

* cited by examiner

<GRAPHENE OXIDE IS REDUCED BY REDUCING AGENT>

<STACK OF PARTLY REDUCED GRAPHENE IS LINKED BY ESTER BOND>

<GRAPHENE OXIDE IS REDUCED BY REDUCING AGENT>

Fig. 18a  Fig. 18b
 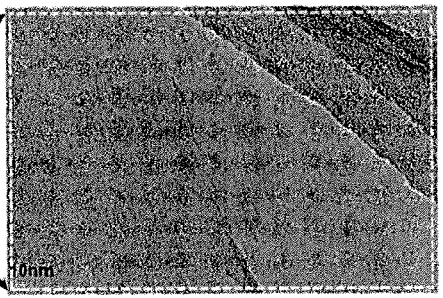
Fig. 19
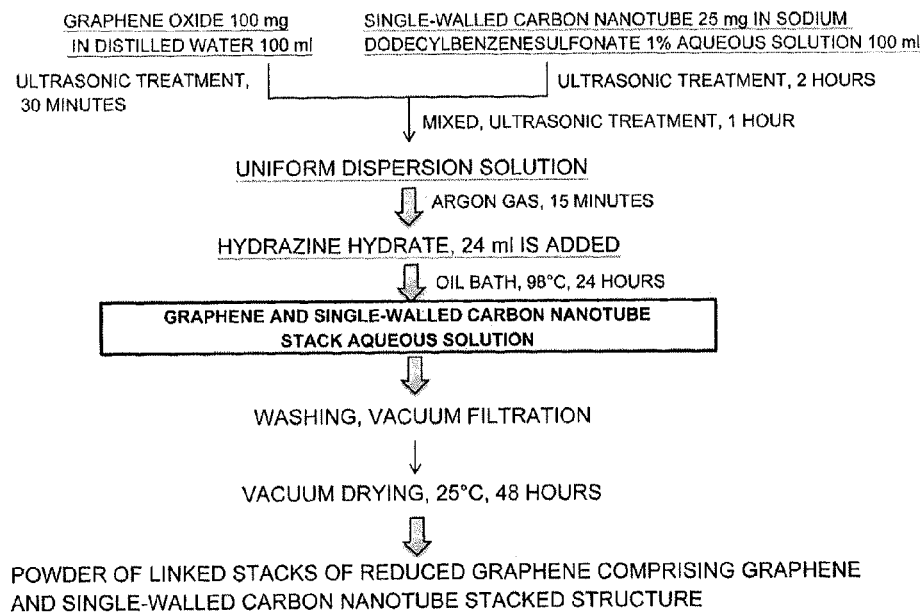

LINKED STACKS OF PARTLY REDUCED GRAPHEN, METHOD FOR PRODUCING LINKED STACKS OF PARTLY REDUCED GRAPHENE, POWER COMPRISING LINKED STACKS OF PARTLY REDUCED GRAPHENE, GRAPHENE ELECTRODE FILM, METHOD FOR PRODUCING GRAPHENE ELCETRODE FILM, AND GRAPHENE CAPACITOR

TECHNICAL FIELD

The present invention relates to linked stacks of partly reduced graphene, a method for producing linked stacks of partly reduced graphene, powder comprising linked stacks of partly reduced graphene, a film comprising linked stacks of partly reduced graphene, a graphene electrode film, a method for producing graphene electrode film, and a graphene capacitor.

In particular, the present invention relates to linked stacks of partly reduced graphene, in which stacks of partly reduced graphene obtained by multilayering partly reduced graphene while using a nanosubstance as a spacer and a conjugative agent are three-dimensionally linked by ester-bonding chemically functionalized molecules of a graphene outer edge to each other, a method for producing the same, and powder and film comprising the same. Also, the present invention relates to a graphene electrode film, in which graphene is laminated while using a single-walled carbon nanotube as a spacer and a linking agent and this laminated graphene is chemically bonded by chemically functionalized molecules of a graphene edge part to utilize the properties of the graphene and the carbon nanotube for allowing high performance, a method for producing the same, and a graphene capacitor.

BACKGROUND ART

Graphene is a sheet of a sp-bonded carbon atom with a thickness of an atom, is a six-membered ring sheet such that a benzene ring is laid on a two-dimensional plane, has a hexagonal lattice structure in a plan view such as a honeycomb composed of a carbon atom and a bond thereof, and has an enormous specific surface area. Also, graphene has excellent properties such as high strength, high electrical conductivity, high transparency, and high thermal conductivity.

Meanwhile, graphite is constituted by stacking graphene sheets in multitude so as to contact with a surface of each other, and these graphenes are strongly bonded by Van der Waals force. Graphite is a structure such that plural graphenes are laminated; however, most surfaces of the laminated graphenes contact with each other, and the property of the highly conductive surfaces is not utilized and excellent properties of the graphenes are lost.

Ordinarily, graphene is produced in such a manner that graphene oxide is produced from graphite, chemically peeled off and then reduced to graphene. This is a producing technique for allowing mass production at a low cost. However, graphene is so unstable by reason of a thickness of a carbon atom that produced graphenes are easily rebonded by Van der Waals force in contacting with each other to reproduce graphite. This is a problem in the producing process of graphene.

FIGS. 1(a) and 1(b) are process drawings explaining that produced graphenes are rebonded to reproduce graphite in the process of producing graphene from graphite. FIG. 1(a) is a structural drawing and FIG. 1(b) is a ball stick model.

First, graphite is oxidized in a liquid of mixed acid to produce graphene oxide. The graphene oxide is peeled off into one sheet by expansion in accordance with the oxidation.

The graphene oxide has a carbonyl group, a hydroxyl group and a carboxyl group on the surface. The affinity of these chemically functionalized molecules with a solvent such as water is so high that the peeled graphene oxide is uniformly dispersed into the water and other solvents.

Next, the peeled graphene oxide is reduced by using a reducing agent. Thus, graphene is produced.

However, the affinity of graphene with a solvent such as water is so low, namely, hydrophobic by reason of not comprising these chemically functionalized molecules that graphene may not be uniformly dispersed into the solvent such as water but be aggregated. Graphene is so unstable by reason of a thickness of a carbon atom that the produced graphenes are easily rebonded by Van der Waals force in aggregating to reproduce graphite.

In Patent Literatures 1 and 2, bumps and nodules are conjugated as a spacer on the surface of graphene so that graphene obtained by reduction is not rebonded. However, this constitution does not allow the maintenance of high electrical conductivity on the surface of graphene to be sufficiently secured.

Also, in Patent Literature 3, a graphene sheet film with a carbon nanotube linked is disclosed and it is described that the graphene sheet film may be applied to a graphene sheet capacitor. However, in Patent Literature 3, since the graphene and the carbon nanotube are mixed up directly, only part of the graphene is subject to self-assemble. Also, the constitution is such as to be conjugated by π-π bonding through the carbon nanotube, and is not a direct bond which becomes electrically and mechanically integral, so that the high electrical conductivity on the surface is not sufficiently maintained.

Also, in Non Patent Literatures 1 to 3, the reduction of graphene oxide is disclosed.

In Non Patent Literature 1, graphene oxide is reduced by hot water of 180° C. in an autoclave. In Non Patent Literature 2, hydrazine is used and graphene oxide is reduced by heating to 150° C. In Non Patent Literature 3, graphene oxide is reduced by two stages of hydrazine and ethylene glycol. All of carboxyl groups and hydroxyl groups of an outer edge of graphene oxide are removed on these strong reduction conditions to produce graphene. As described above, graphene is so unstable by reason of a thickness of a carbon atom as to reproduce graphite.

Thus, the fact is that a graphene laminated structure, in which high electrical conductivity on the surface of graphene is maintained, is not obtained, and a new structure, in which the property of high electrical conductivity on the surface of graphene is utilized, and the establishment of a producing method therefor are demanded.

Meanwhile, a high-performance storage device is also demanded for efficiently utilizing of energy.

Among various storage devices, a capacitor, particularly, an electric double layer capacitor is so large in power density as to allow high-speed charge and discharge. However, it has been conceived so far that energy density is small, and the capacitor may not meet large-capacity needs for electric cars and so on.

Graphene with a thickness of a carbon atom is presently larger by far in specific surface area and electrical conductivity than activated carbon powder used for a capacitor electrode to allow capacitor performance to be dramatically improved. Graphene is the largest in specific surface area and electrical conductivity among substances, and is extremely excellent as a capacitor electrode material.

As described above, as shown in FIGS. 1(a) and 1(b), graphene is ordinarily made from graphite. The method is chemical treatment based on Hummers method for allowing mass production at a low cost. In this method, in order to produce a capacitor utilizing the properties of graphene, when graphene oxide is reduced to graphene, the problem is that graphene is hydrophobic and is not to be uniformly dispersed into an aqueous solution, and graphene peeled off into one sheet aggregates again as shown in FIG. 2 and is rebonded to each other to return to original graphite.

A method for making a spacer composed of nanoparticles insert between graphenes is proposed for preventing graphene from being rebonded to reproduce original graphite (Patent Literatures 1, 2 and 4). However, the concept that nanoparticles are used as a spacer is only proposed, and it is not specifically disclosed how to complex nanoparticles or how to utilize nanoparticles as a spacer.

A graphene capacitor electrode used a carbon nanotube as nanoparticles and complexed with graphene is proposed (Patent Literature 3 and Non Patent Literatures 1 to 4).

Here, the carbon nanotube has a role as a spacer for preventing graphene from being rebonded to reproduce original graphite. In addition, the carbon nanotube has a role as a linking agent for linking graphene sheets by $\pi$-$\pi$ bonding. The carbon nanotube and graphene are complexed to form a graphene laminated structure. Incidentally, a term such as a stacked structure is used in Non Patent Literatures 1 and 3, but no description is offered on a specific stacked structure.

FIG. 3 is a perspective view showing an example of a graphene laminated structure using a carbon nanotube (CNT) as a spacer.

Since the carbon nanotube has high electrical conductivity, the graphene laminated structure comprising the carbon nanotube between graphenes has also high electrical conductivity. Thus, a graphene stacked structure utilizing a large specific surface area and electrical conductivity of graphene is made. However, graphene is directly bonded so easily by reason of intermolecular force between graphene sheets as to narrow an interlayer gap and decrease the adsorption amount of an electrolyte. Accordingly, sufficient performance may not be exhibited for being put to practical use as a capacitor electrode. The addition of the carbon nanotube improves the electrical conductivity and serves as a role of an adhesive.

No reports have been made so far about an electrode film having so thick a film thickness as to allow sufficient performance to be exhibited for being put to practical use as a capacitor electrode and having a graphene stacked structure utilizing electrical conductivity of graphene, which has large power density and energy density to allow high-speed charge and discharge.

CITATION LIST

Patent Literatures

Patent Literature 1: US 2011/0157772 A
Patent Literature 2: US 2011/0165321 A
Patent Literature 3: WO 2012/073998 A
Patent Literature 4: U.S. Pat. No. 7,623,340

Non Patent Literatures

Non Patent Literature 1: J. Phys. Chem., 2011, 115, 23192-23197, Y. Wang, Y. Wu, Y. Huang, F. Zhang, X. Yang, Y. Ma and Y. Chen (pages 23192-23193, FIG. 3)

Non Patent Literature 2: Electrochimica Acta, 2011, 56, 1629-1635, K-S. Kim and S-J. Park (page 1631)
Non Patent Literature 3: J. Mater. Chem., 2011, 21, 2374-2380, S-Y. Yang, K-H. Chang, H.-W. Tien, Y.-F. Lee, S-M. Li, Y.-S. Wang, J.-Y. Wang, C.-C. M. Ma and C.-C. Hu (page 2375, FIGS. 1(a) and 1(b))
Non Patent Literature 4: J. Phys. Chem. Lett., 2010, 1, 467-470, D. Yu and L. Dai (all)

SUMMARY OF INVENTION

Technical Problem

The object of the present invention is to provide linked stacks of partly reduced graphene, in which the property of graphene with a highly conductive surface is maintained, a method for producing the same, and powder and film comprising linked stacks of partly reduced graphene.

In particular, the problem is that graphene is stacked with the property retained and becomes the size on a practical scale.

Also, the object of the present invention is to provide a graphene electrode film, which has large power density and energy density to allow high-speed charge and discharge, a method for producing the same, and a graphene capacitor.

Solution to Problem

The inventors of the present invention have attempted to produce linked stacks of graphene, in which the property of graphene with a highly conductive surface is maintained, through trial and error. As a result, they have obtained (1) findings about the control of chemically functionalized molecules for bringing the properties of hydrophilic graphene oxide and hydrophobic graphene, (2) findings about a three-dimensional stacked structure of graphene by an ester bond through a dehydration condensation reaction between a carboxyl group and a hydroxyl group, and (3) findings about powder and film having a graphene stacked structure with the property of graphene retained directly. Thus, they have completed the present invention by finding out that linked stacks of partly reduced graphene, in which the property of graphene with a highly conductive surface is maintained, may be produced while stacks of partly reduced graphene uniformly dispersed into an aqueous solution may be three-dimensionally linked to each other by ester-bonding a carboxyl group (COOH) and a hydroxyl group (OH) as chemically functionalized molecules of a graphene outer edge to each other without deteriorating dispersibility in an aqueous solution by going by way of partly reduced graphene. The present invention has the following constitution.

(1) Linked stacks of partly reduced graphene comprising two or more stacks of partly reduced graphene linked together, wherein the stack of partly reduced graphene has two or more sheets of partly reduced graphene and a nanosubstance held between the sheets of partly reduced graphene, the partly reduced graphene has no carbonyl groups and has carboxyl groups and hydroxyl groups, and different stacks of partly reduced graphene are linked to each other by an ester bond.

(2) The linked stacks of partly reduced graphene according to (1), wherein the nanosubstance comprises a conductive material and is a particle, a rod-like body, a cylindrical body or a fibrous body with a diameter of 0.3 nm or more and 100 nm or less.

(3) The linked stacks of partly reduced graphene according to (2), wherein the diameter is 1 to 10 nm.

(4) The linked stacks of partly reduced graphene according to (2), wherein the nanosubstance is a carbon nanotube.

(5) The linked stacks of partly reduced graphene according to any one of (1) to (4), wherein a plurality of the stacks of partly reduced graphene are linked together in either or both of a parallel direction and a perpendicular direction to a sheet plane of the reduced graphene.

(6) The linked stacks of partly reduced graphene according to (5), wherein the plurality of the stacks of partly reduced graphene are three-dimensionally linked together.

(7) A method for producing linked stacks of partly reduced graphene, comprising step of preparing a dispersion solution in such a manner that graphene oxide having carboxyl groups, hydroxyl groups and carbonyl groups is dispersed into a solvent together with a nanosubstance comprising a conductive material and being a particle, a rod-like body, a cylindrical body or a fibrous body with a diameter of 0.3 nm or more and 100 nm or less, and step of producing linked stacks of partly reduced graphene in such a manner that a reducing agent is added to the dispersion solution under an inert gas atmosphere to convert the graphene oxide into partly reduced graphene, in which only the carbonyl groups are reduced and the carboxyl groups and the hydroxyl groups are left, and link a plurality of the partly reduced graphene together by forming an ester bond through a dehydration condensation reaction between the carboxyl groups of one partly reduced graphene and the hydroxyl groups of another partly reduced graphene.

(8) The method for producing linked stacks of partly reduced graphene according to (7), wherein a surfactant is added to the solvent.

(9) The method for producing linked stacks of partly reduced graphene according to (7) or (8), wherein the reducing agent is a hydrazine hydrate.

(10) The method for producing linked stacks of partly reduced graphene according to (7), wherein the dispersion solution is heated to a temperature of "the boiling point of water (100° C.)—10° C." or more and less than "the boiling point of water (100° C.)" to then add the reducing agent thereto.

(11) The method for producing linked stacks of partly reduced graphene according to (10), wherein the reducing agent is added to thereafter maintain a heating state at a temperature of "the boiling point of water (100° C.)—10° C." or more and less than "the boiling point of water (100° C.)" under an inert gas atmosphere for 20 hours or more.

(12) The method for producing linked stacks of partly reduced graphene according to (7), wherein graphite is mixed into water together with sodium nitrate then disperse into sulfuric acid, potassium permanganate and hydrogen peroxide, and graphene is peeled off from the graphite into graphene oxide, which is thereafter filtered to produce graphene oxide.

(13) Powder comprising linked stacks of reduced graphene comprising the linked stacks of partly reduced graphene according to any one of (1) to (6).

(14) A film comprising linked stacks of partly reduced graphene comprising the linked stacks of partly reduced graphene according to any one of (1) to (6).

The inventors of the present invention have completed the present invention by finding out that the production of partly reduced graphene in the process of producing graphene from graphite through graphene oxide allows a stacked structure of graphene and a carbon nanotube to be produced in a one-time consistent process while incorporating the process for a stacked structure, and finding out that a carbon nanotube with an appropriate shape (length) and the use of a surfactant allow improved dispersibility and high density. The present invention has the following constitution.

(15) A graphene electrode film comprising linked stacks of partly reduced graphene in which two or more stacks of partly reduced graphene are linked together by an ester bond, wherein the stack of partly reduced graphene is a stack in which two or more sheets of partly reduced graphene are laminated and a nanosubstance is held between the lamination layers, and the partly reduced graphene is graphene having carboxyl groups and hydroxyl groups in an edge part.

(16) The graphene electrode film according to (15), wherein the nanosubstance comprises a conductive material and is a particulate material, a rod-like body, a cylindrical body or a fibrous body with a diameter of 0.3 nm or more and 100 nm or less.

(17) The graphene electrode film according to (16), wherein the diameter is 1 to 10 nm.

(18) The graphene electrode film according to (16) or (17), wherein the nanosubstance is a carbon nanotube.

(19) The graphene electrode film according to (18), wherein a length of the carbon nanotube is 2 to 5 μm.

(20) The graphene electrode film according to (15), wherein the stacks of partly reduced graphene are three-dimensionally linked together.

(21) The graphene electrode film according to (15), wherein a film thickness is 0.1 mm or more.

(22) A method for producing a graphene electrode film, comprising step of preparing a dispersion solution in such a manner that powder comprising graphene oxide is dispersed into a solvent together with a nanosubstance comprising a conductive material and being a particulate material, a rod-like body, a cylindrical body or a fibrous body with a diameter of 0.3 nm or more and 100 nm or less, step of producing a reduction solution comprising linked stacks of partly reduced graphene by adding a reducing agent to the dispersion solution under an inert gas atmosphere, and step of producing a graphene electrode film from the reduction solution by a wet film-forming method or a filtering method.

(23) The method for producing a graphene electrode film according to (22), wherein the nanosubstance is a carbon nanotube.

(24) The method for producing a graphene electrode film according to (22) or (23), wherein a surfactant is further added to the solvent to prepare the dispersion solution.

(25) The method for producing a graphene electrode film according to (24), wherein sodium dodecylbenzenesulfonate is used as the surfactant, and added by 0.5 to 1.5 wt % to prepare the dispersion solution.

(26) The method for producing a graphene electrode film according to (22), wherein the reducing agent is a hydrazine hydrate.

(27) The method for producing a graphene electrode film according to (22), wherein the dispersion solution is heated to a temperature range of "the boiling point of water (100° C.)—10° C." or more and less than "the boiling point of water (100° C.)" to then add the reducing agent thereto.

(28) The method for producing a graphene electrode film according to (27), wherein the reducing agent is added to thereafter maintain a heating state at a temperature range of "the boiling point of water (100° C.)—10° C." or more and less than "the boiling point of water (100° C.)" under an inert gas atmosphere for 20 hours or more.

(29) The method for producing a graphene electrode film according to (22), wherein graphite is mixed into water together with sodium nitrate, then disperse into sulfuric acid, potassium permanganate and hydrogen peroxide, and graphene is peeled off from the graphite into graphene oxide, which is thereafter filtered to produce graphene oxide.

(30) A graphene capacitor comprising a hermetically sealable vessel and a capacitor body part arranged in the vessel, in which an electrolyte impregnated layer is provided between two sheets of electrode films, wherein each of the electrode films is the graphene electrode film according to any one of (15) to (23).

Advantageous Effects of Invention

Linked stacks of partly reduced graphene of the present invention are linked stacks of partly reduced graphene comprising two or more stacks of partly reduced graphene linked together, and have a constitution such that the stack of partly reduced graphene has two or more sheets of partly reduced graphene and a nanosubstance held between the sheets of partly reduced graphene, the partly reduced graphene has no carbonyl groups and has carboxyl groups and hydroxyl groups, and different stacks of partly reduced graphene are linked to each other by an ester bond; therefore, linked stacks of partly reduced graphene, in which the property of graphene with a highly conductive surface is maintained, may be produced. Even though the thickness is as thick as a carbon atom and the area is ordinarily 5 to 20 µm, graphene may be utilized as a material with high strength and high electrical conductivity without deteriorating high electrical conductivity on the surface of graphene at all.

A method for producing linked stacks of partly reduced graphene of the present invention has a constitution comprising step of preparing a dispersion solution in such a manner that graphene oxide having carboxyl groups, hydroxyl groups and carbonyl groups is dispersed into a solvent together with a nanosubstance comprising a conductive material and being a particle, a rod-like body, a cylindrical body or a fibrous body with a diameter of 0.3 nm or more and 100 nm or less, and step of producing linked stacks of partly reduced graphene in such a manner that a reducing agent is added to the dispersion solution under an inert gas atmosphere to convert the graphene oxide into partly reduced graphene, in which only the carbonyl groups are reduced and the carboxyl groups and the hydroxyl groups are left, and link a plurality of the partly reduced graphene together by forming an ester bond through a dehydration condensation reaction between the carboxyl groups of one partly reduced graphene and the hydroxyl groups of another partly reduced graphene; therefore, linked stacks of partly reduced graphene, in which the property of partly reduced graphene with a highly conductive surface is maintained, may be produced while stacks of partly reduced graphene uniformly dispersed into an aqueous solution may be three-dimensionally linked to each other by ester-bonding chemically functionalized molecules of a graphene outer edge to each other without deteriorating dispersibility in an aqueous solution by going by way of partly reduced graphene. This method is easy and allows production costs to be decreased by reason of merely mixing two solutions together. Also, the method allows the yield to be increased.

Powder comprising linked stacks of partly reduced graphene of the present invention has a constitution comprising the linked stacks of partly reduced graphene described above; therefore, graphene may be made into a stacked structure while maintaining high electrical conductivity on the surface, and made into paper and materials utilizing properties and functions of graphene.

A film comprising linked stacks of partly reduced graphene of the present invention has a constitution comprising the linked stacks of partly reduced graphene described above; therefore, graphene may be made into a stacked structure while maintaining high electrical conductivity on the surface, and made into paper and materials utilizing properties and functions of graphene.

A graphene electrode film of the present invention is a graphene electrode film comprising linked stacks of partly reduced graphene in which two or more stacks of partly reduced graphene are linked together by an ester bond, and has a constitution such that the stack of partly reduced graphene is a stack in which two or more sheets of partly reduced graphene are laminated and a nanosubstance is held between the lamination layers, and the partly reduced graphene is graphene having carboxyl groups and hydroxyl groups in an edge part; therefore, high electrical conductivity property of graphene with the largest specific surface area among substances may be utilized while making a nanosubstance intervene as a conductive spacer between partly reduced graphenes.

Also, a structure of stacks of partly reduced graphene, in which multilayer partly reduced graphene is linked by a highly conductive nanosubstance, may be made into a stacked structure three-dimensionally linked electrically and mechanically without any gaps by a chemical bond (an ester bond), a long-life electrode film which is electrically and mechanically stable and thick in film thickness may be provided, an electrode film having large power density and energy density to allow high-speed charge and discharge may be provided, the electrode film may be applied to a capacitor electrode, and capacitor performance may be increased dramatically.

Also, an unstable sheet with a thickness of a carbon atom is stabilized while using a carbon nanotube as a spacer between graphenes, which sheet is made into graphene lamination by self-assemble, and this lamination may be made into a three-dimensional stacked structure and be easily increased to practicable thickness while retaining high electrical conductivity property of graphene.

A graphene electrode film of the present invention has a constitution such that the nanosubstance is a carbon nanotube; therefore, for example, a high-density stack of partly reduced graphene with a narrow graphene interval may be produced by using a single-walled carbon nanotube with high electrical conductivity and a small tube diameter, and energy density and power density of an electrode film comprising linked stacks of partly reduced graphene may be increased while utilizing the property of high electrical conductivity in both the graphene and the carbon nanotube.

Also, the use of a single-walled carbon nanotube cut into a predetermined length allows linked stacks of partly reduced graphene to be made into higher density while making no excessive gaps by not making the single-walled carbon nanotube stick out of a space between stacks of partly reduced graphene.

A method for producing a graphene electrode film of the present invention has a constitution comprising step of preparing a dispersion solution in such a manner that powder comprising graphene oxide is dispersed into a solvent together with a nanosubstance comprising a conductive material and being a particulate material, a rod-like body, a cylindrical body or a fibrous body with a diameter of 0.3 nm or more and 100 nm or less, step of producing a reduction solution comprising linked stacks of partly reduced graphene by adding a reducing agent to the dispersion solution under an inert gas atmosphere, and step of producing a graphene electrode film from the reduction solution by a wet film-forming method or a filtering method; therefore, first, an aqueous solution in which graphene oxide and a carbon nanotube are uniformly dispersed is mixed in step of preparing a dispersion solution, and graphene oxide lamination comprising the carbon nanotube as a spacer may be formed by π-π bonding between graphene oxide and the carbon nanotube.

Also, in step of producing a reduction solution, partly reduced graphene, in which the carbonyl groups on the surface of graphene oxide are removed but the carboxyl groups and the hydroxyl groups in a graphene edge part are left, is produced by adding hydrazine while controlling the reducing process, and this partly reduced graphene is linked by two or more sheets by a nanosubstance to produce a stack of partly reduced graphene, and a plurality of stacks of partly reduced graphene may be firmly linked by an ester bond while forming an ester bond through a dehydration condensation reaction between the carboxyl groups of one partly reduced graphene and the hydroxyl groups of another partly reduced graphene to produce a reduction solution comprising linked stacks of partly reduced graphene having a three-dimensional stacked structure with high density and favorable array.

Also, in step of producing a graphene electrode film, a graphene electrode film, which has large power density and energy density to allow high-speed charge and discharge, may be easily produced from the reduction solution by using a wet film-forming method or a filtering method.

Also, the process of chemically producing graphene from oxidation treatment of graphite is directly utilized without requiring a special process, and a method for laminating graphene and a method for stacking graphene may be collectively incorporated into the process, and may be made into a simple method at a low cost. Also, mass production may be easily made.

Also, graphite which is as inexpensive as approximately one two-hundredth the price of a single-walled carbon nanotube may be used, and graphene may be produced at an extremely low cost.

A method for producing a graphene electrode film of the present invention has a constitution such that a surfactant is further added to the solvent to prepare the dispersion solution; therefore, also a nanosubstance which is uniformly dispersed into an aqueous solution with difficulty, for example, a carbon nanotube may be dispersed well into an aqueous solution while the nanosubstances (the carbon nanotubes) are repelled to each other by Coulomb force by depositing a surfactant ion to ionize, and linked stacks of partly reduced graphene in which the nanosubstance (the carbon nanotube) is uniformly dispersed may be produced.

A graphene capacitor of the present invention is a capacitor comprising a hermetically sealable vessel and a capacitor body part arranged in the vessel, in which an electrolyte impregnated layer is provided between two sheets of electrode films, and has a constitution such that either of the electrode films is the graphene electrode film described above; therefore, a stacked structure of linked stacks of partly reduced graphene may be applied to an electric double layer capacitor to provide a graphene capacitor, which has large power density and energy density to allow high-speed charge and discharge.

The performance of a produced graphene capacitor may complete exceeding conventional activated carbon powder capacitor electrode performance (an energy density of 10 Wh/kg, a power density of 5 kW/kg) by ten times or more. Hereafter, all conventional capacitors may be replaced by studying the application of natural energy such as wind power generation to electric storage and a capacitor for electric cars. As a result, an unprecedented high-performance graphene capacitor is allowed.

BRIEF DESCRIPTION OF DRAWINGS

Also, FIG. 14 shows the carbon nanotube in a solution containing the surfactant. The molecular components of the surfactant are bonded to the surface of the carbon nanotube and ionized.

FIG. 18(*a*) is a low-magnification photograph of a sheet of obtained graphene oxide.

FIG. 18(*b*) is a high-magnification photograph of graphene oxide in the vicinity of a marked part (□ part) of FIG. 18(*a*).

FIG. 19 is a flow chart showing an example of a method for producing linked stacks of partly reduced graphene.

FIG. 20(*b*) is an A-part magnified view of FIG. 20(*a*).

FIG. 22(*b*) is a cross-sectional view of FIG. 22(*a*) in B-B' line.

FIG. 25(*b*) is an electron microscope photograph (SEM photograph) of a material of Example 5. FIGS. 25(*a*) and 25(*b*) is such that a surfactant is added.

FIG. 26(*b*) is an electron microscope photograph (SEM photograph) of a material of Example 6. FIGS. 26(*a*) and 26(*b*) are such that a surfactant is not added.

FIG. 28(*b*) shows results of measuring electrochemical properties of various kinds of electrode materials by a coin-cell type experimental capacitor.

FIG. 28(*c*) shows a charge and discharge curve, showing an influence of voltage on electrochemical properties.

FIG. 28(*d*) shows a charge and discharge curve, showing a relation between voltage and current.

DESCRIPTION OF EMBODIMENTS

Embodiments of the Present Invention

Linked stacks of partly reduced graphene, a method for producing the same, and powder and film comprising the same as embodiments of the present invention are hereinafter described while referring to accompanying drawings.
<Linked Stacks of Partly Reduced Graphene>

First, linked stacks of partly reduced graphene as an embodiment of the present invention are described.

Figure 1A:
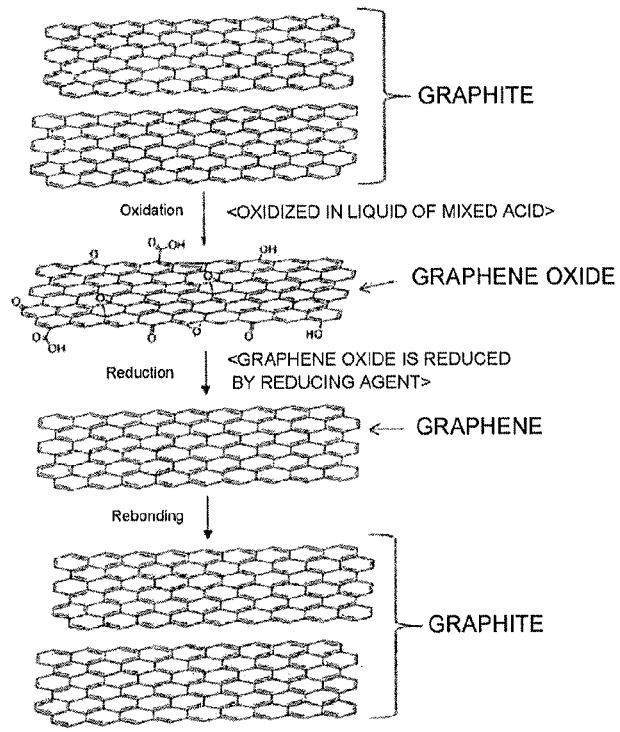
FIG. 1(a) is a process drawing explaining that produced graphenes are rebonded to reproduce graphite in the process of producing graphene from graphite through graphene oxide.
Figure 1B:
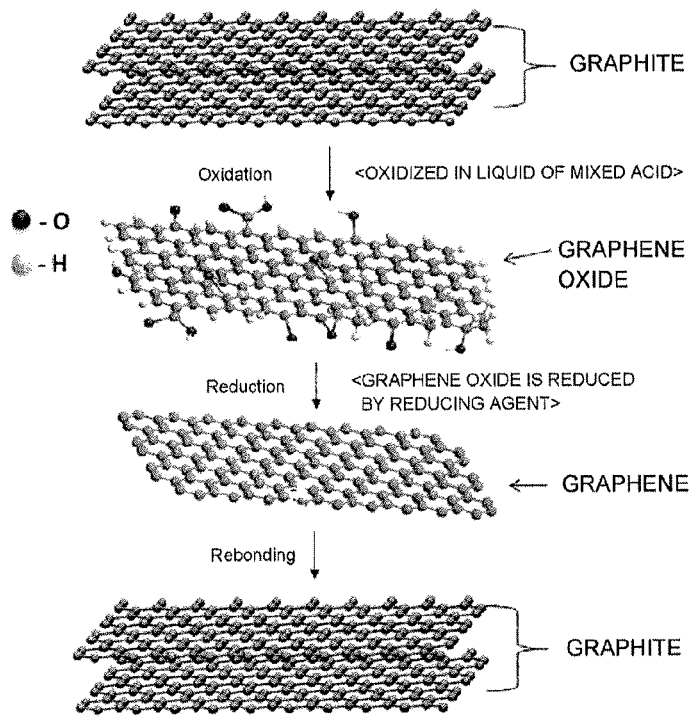
FIG. 1(b) is another process drawing explaining that produced graphenes are rebonded to reproduce graphite in the process of producing graphene from graphite through graphene oxide.
Figure 2:
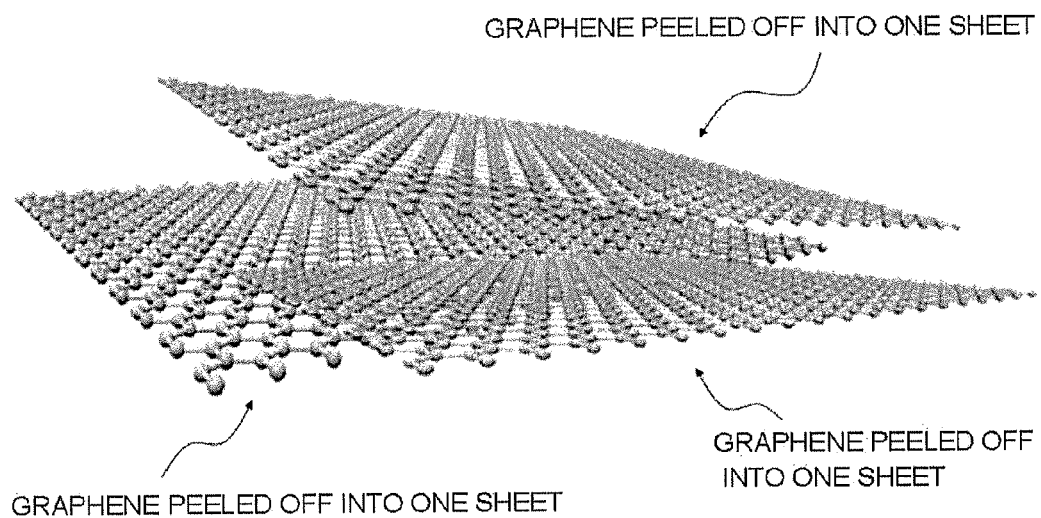
FIG. 2 is a perspective view showing an example of graphene peeled off into one sheet.
Figure 3:
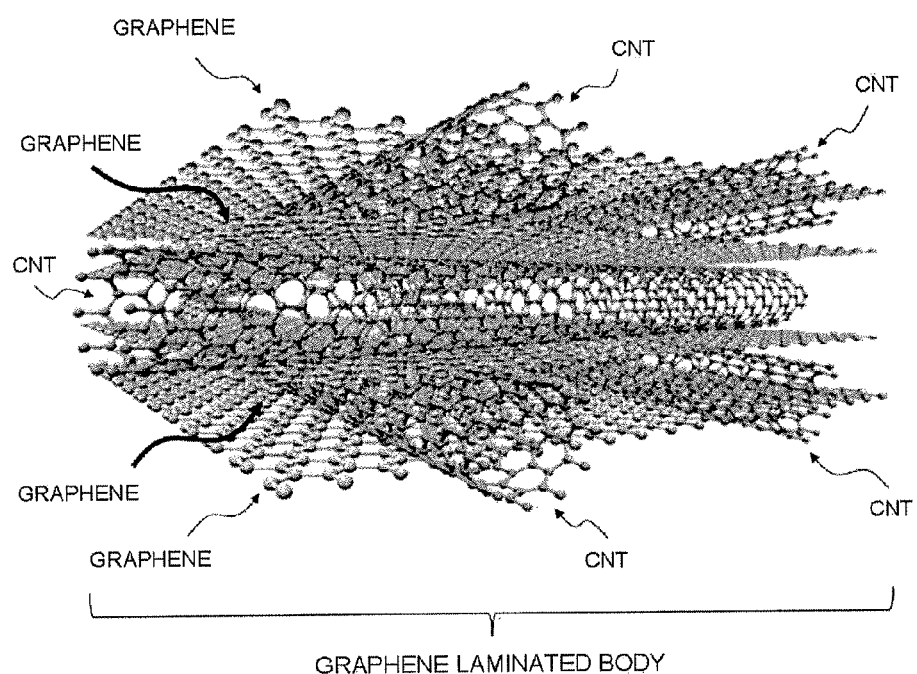
FIG. 3 is a perspective view showing an example of a graphene laminated structure using a carbon nanotube as a spacer.
Figure 4:
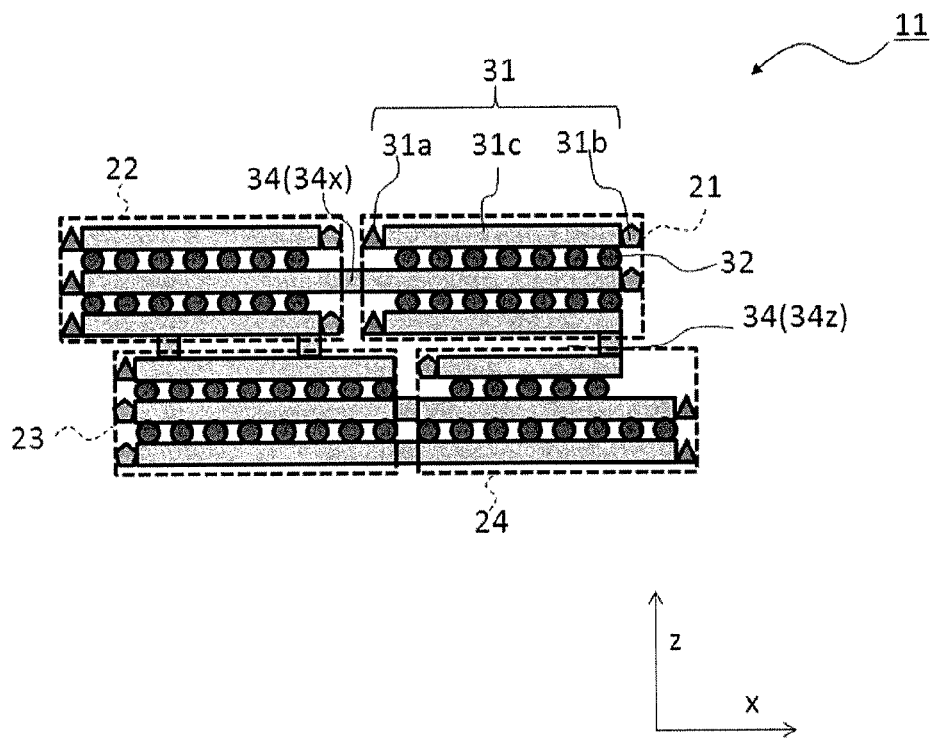
FIG. 4 is a schematic view showing an example of linked stacks of reduced graphene of the present invention.

FIG. 4 is a schematic view showing an example of linked stacks of partly reduced graphene as an embodiment of the present invention. As shown in FIG. 4, a linked stack of partly reduced graphene 11 as an embodiment of the present invention is roughly constituted so that four stacks of partly reduced graphene 21 to 24 are linked to each other by an ester bond 34. Additionally, the number of stacks of partly reduced graphene to be linked may be two or more and is not limited to four.

The stacks of partly reduced graphene 21 to 24 are linked to each other in a parallel direction (x direction) and a perpendicular direction (z direction) to a sheet plane of partly reduced graphene, and linked three-dimensionally.

However, the stacks of partly reduced graphene are linked not merely in both of the directions, but also may be linked in only the parallel direction or in only the perpendicular direction.

The stack of partly reduced graphene 21 is 5 to 20 μm in size, for example.

The stack of partly reduced graphene 21 has three sheets of partly reduced graphene 31 and a nanosubstance 32 held between the partly reduced graphene 31.

Additionally, the number of partly reduced graphene may be two or more sheets and is not limited to three sheets.

Ordinarily, the partly reduced graphene 31 is merely as minute as approximately 10 to 20 sheets.

Also, the number of nanosubstances is not limited.

Figure 5:
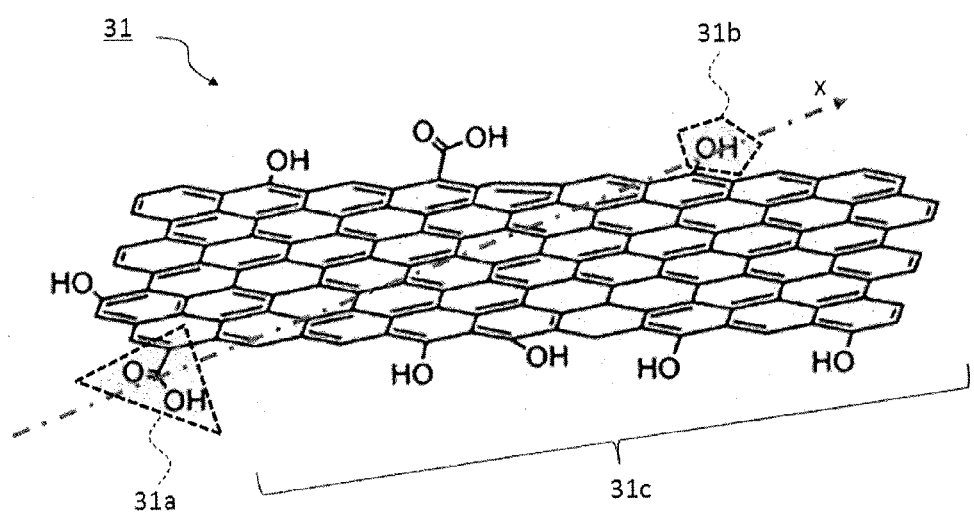
FIG. 5 is a chemical structural view showing an example of reduced graphene.

FIG. 5 is a chemical structural view showing an example of partly reduced graphene.

As shown in FIG. 5, the partly reduced graphene 31 has a partly reduced graphene body part 31*c*, and carboxyl groups 31*a* and hydroxyl groups 31*b*. The carboxyl groups 31*a* and hydroxyl groups 31*b* are at an outer edge of the partly reduced graphene body part 31*c*. The partly reduced graphene 31 has no carbonyl groups.

FIGS. 6(*a*) and 6(*b*) are views showing an example of an ester bond.

FIG. 6(*a*) is a view showing an example such that the stacks of partly reduced graphene are linked in a parallel direction (x direction) to a sheet plane of partly reduced graphene, and FIG. 6(*b*) is a view showing an example such that the stacks of partly reduced graphene are linked in a perpendicular direction (z direction) to a sheet plane of partly reduced graphene.

Two partly reduced graphene body parts 31*c* are each linked by an ester bond 34. That is to say, a plurality of the stacks of partly reduced graphene are linked by both an ester bond 34*x* in a parallel direction and an ester bond 34*z* in a perpendicular direction to a sheet plane of reduced graphene, and the plurality of the stacks of partly reduced graphene are linked three-dimensionally.

However, the plurality of the stacks of partly reduced graphene are not limited to this constitution but may be linked in either of a parallel direction and a perpendicular direction to a sheet plane of partly reduced graphene.

Figure 7:
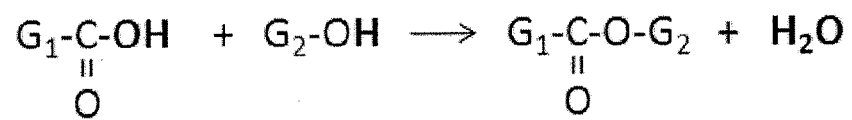
FIG. 7 is a chemical reaction formula for producing an ester bond.

FIG. 7 is a chemical reaction formula for producing an ester bond. Each of $G_1$ and $G_2$ is a partly reduced graphene body part.

As shown in FIG. 7, an ester bond is formed by a dehydration condensation reaction between carboxyl groups and hydroxyl groups. The stacks of partly reduced graphene are linked by forming an ester bond through a dehydration condensation reaction between the carboxyl groups of one partly reduced graphene and the hydroxyl groups of another partly reduced graphene.

It is preferable that the nanosubstance comprises a conductive material and is a particle, a rod-like body, a cylindrical body or a fibrous body with a diameter of 0.3 nm or more and 100 nm or less. The use of a conductive material allows the high electrical conductivity property on the surface of graphene not to be deteriorated.

Additionally, the use of a material having hydroxyl groups on the surface allows the nanosubstance to be strongly conjugated to a sheet plane of partly reduced graphene, and allows the stack of partly reduced graphene to be formed while strongly conjugating two sheet planes of partly reduced graphene through the nanosubstance.

The diameter is 1 to 10 nm more preferably. Thus, linked stacks of partly reduced graphene made into high density by further narrowing the graphene plane gap may be produced.

The introduction of the nanosubstance as a spacer causes a problem that the specific surface area of graphene is decreased and the surface properties are deteriorated. However, the use of a conductive material as a spacer allows partly reduced graphene to be electrically bonded, and allows electrical conductivity to be restrained from deteriorating. Also, the use allows partly reduced graphene to be mechanically bonded, and allows strength to be restrained from deteriorating.

The nanosubstance is preferably a carbon nanotube (CNT). Examples of the CNT include SWCNT (single-walled type: Single wall) and DWCNT (double-walled type: Double wall). Carbon nanohorn (CNH) may be used. Also, conductive fiber comprising CNT or conductive fiber in which these are bundled may be used.

The nanosubstance intervenes between graphenes as a spacer and a conjugative agent between graphenes to prevent graphenes from being rebonded and allow the stack of partly reduced graphene to be produced. The properties and functions of graphene may not merely be utilized directly but also the properties and functions of the nanosubstance may be added.

<Method for Producing Linked Stacks of Partly Reduced Graphene>

A method for producing linked stacks of partly reduced graphene as an embodiment of the present invention has dispersion solution preparing step S1 and linked stacks of partly reduced graphene producing step S2.

Figure 8:
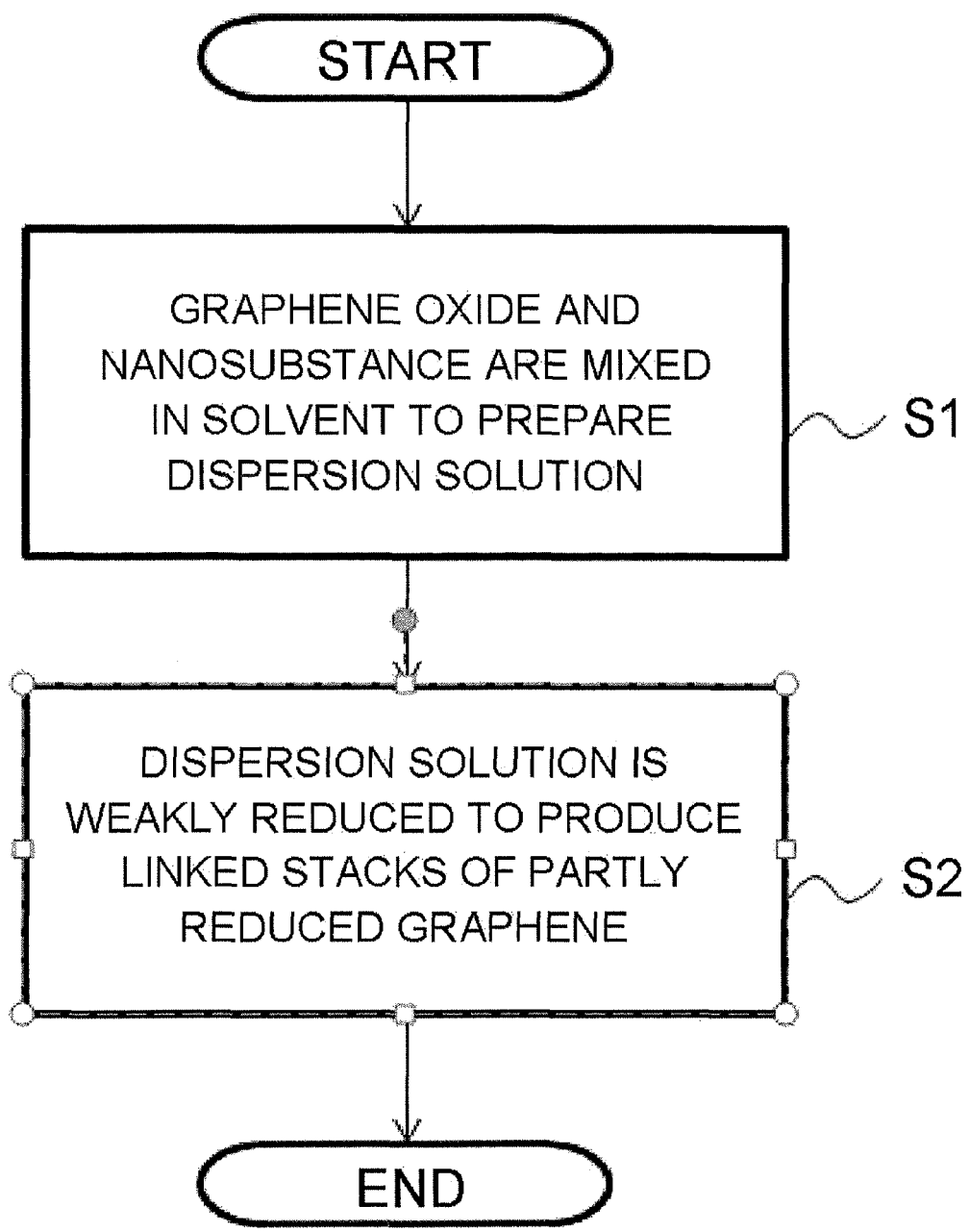
FIG. 8 is a flow chart showing an example of a method for producing linked stacks of partly reduced graphene of the present invention.

FIG. 8 is a flow chart showing an example of a method for producing linked stacks of partly reduced graphene as an embodiment of the present invention.

Additionally, graphene oxide producing step is preferable in that the following step is a process for allowing mass production at a low cost.

[Graphene Oxide Producing Step]

First, graphite is mixed into water together with sodium nitrate.

Next, sulfuric acid, potassium permanganate and hydrogen peroxide are each added and dispersed by a predetermined amount. Thus, they may be uniformly dispersed. Additionally, they are preferably added in this order and stirred every time they are added.

Next, graphene which constitute graphite may be oxidized by dispersing these well. Graphene oxide may be easily peeled off into one sheet by reason of having carboxyl groups, hydroxyl groups and carbonyl groups and expanding.

Next, graphene is peeled off from the graphite into graphene oxide to thereafter filter a solution containing graphene oxide. Thus, powder composed of graphene oxide is obtained. The powder is preferably washed well in water and so on.

This step is improved on the basis of Hummers method. Graphene oxide may be mass-produced at a low cost.

[Dispersion Solution Preparing Step S1]

Next, a dispersion solution is prepared in such a manner that graphene oxide having carboxyl groups, hydroxyl groups and carbonyl groups is dispersed into a solvent together with a nanosubstance comprising a conductive material and being a particle, a rod-like body, a cylindrical body or a fibrous body with a diameter of 0.3 nm or more and 100 nm or less.

A solution in which hydrophilic graphene oxide and a nanosubstance are uniformly dispersed is mixed, so that a stack of graphene oxide in which graphene oxide is laminated while using the nanosubstance as a spacer and a bonding agent may be autonomously produced in the dispersion solution by self-assemble.

A surfactant may be added to a solvent.

For example, in the case of using a carbon nanotube as a nanosubstance, sodium dodecylbenzenesulfonate is preferably used as the surfactant. Thus, the nanosubstance may be dispersed more uniformly.

The homogenization by ultrasonic waves is preferably used for dispersing into a solvent. Thus, graphene oxide and a nanosubstance may be each dispersed uniformly into one solution and efficiently subjected to self-assemble.

First, a solution, in which graphene oxide is uniformly dispersed in a state of separating graphene oxide into one sheet, is prepared and then mixed with a solution in which a nanosubstance is uniformly dispersed, and graphene oxide and a nanosubstance are each dispersed uniformly into one solution, so that autonomous assembly, namely, self-assemble may be performed, and the nanosubstance is conjugated to the graphene oxide surface and superposed in large amounts to allow a stack of graphene oxide to be produced.

Self-assemble is such that graphene lamination holding a nanosubstance as a spacer therebetween is autonomously formed by repeatedly depositing a nanosubstance deposited to one graphene surface to another graphene surface.

The stack of graphene oxide has a structure of making a nanosubstance intervene as a spacer, and utilizes exclusive excellent properties such as high electrical conductivity and high strength on the graphene surface.

[Linked Stacks of Reduced Graphene Producing Step S2]

Next, autonomously three-dimensional linked stacks of partly reduced graphene is produced in such a manner that a reducing agent is added to the dispersion solution under an inert gas atmosphere to convert the graphene oxide into partly reduced graphene, in which only the carbonyl groups are reduced and the carboxyl groups and the hydroxyl groups are left at a graphene outer edge, and link a plurality of the partly reduced graphene together mechanically and electrically by forming an ester bond through a dehydration condensation reaction between the carboxyl groups of one partly reduced graphene and the hydroxyl groups of another partly reduced graphene.

Figure 9:
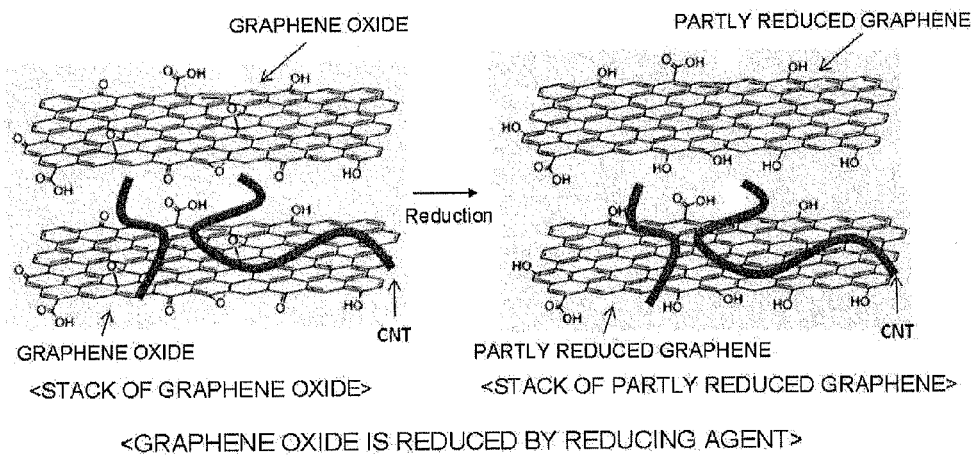
FIG. 9 is a view showing an example of a reduction reaction of a stack of graphene oxide, and a view showing a reaction in which graphene oxide is converted into partly reduced graphene.
Figure 10:
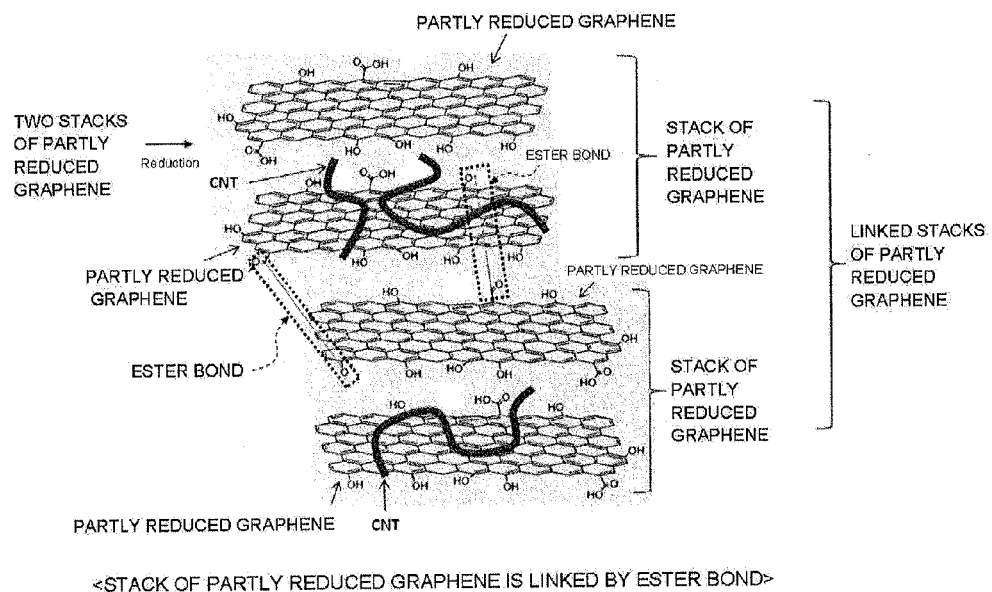
FIG. 10 is a view showing another example of a reduction reaction of a stack of graphene oxide, and a view showing a reaction in which partly reduced graphene is linked to each other by an ester bond.

FIGS. 9 and 10 are views showing an example of a reduction reaction of a stack of graphene oxide.

FIG. 9 is a view showing an example of a reduction reaction of a stack of graphene oxide, and a view showing a reaction in which graphene oxide is converted into partly reduced graphene. Thus, graphene oxide is converted into partly reduced graphene in which only the carbonyl groups are reduced and the carboxyl groups and the hydroxyl groups are left at a graphene outer edge.

FIG. 10 is a view showing another example of a reduction reaction of a stack of graphene oxide, and a view showing a reaction in which partly reduced graphene is linked to each other by an ester bond. An example of forming an ester bond at two sites is shown, and the case of linking at one site and the case of linking at three or more sites are also possible. Also, an example of linking in z direction is shown, and the case of linking in x direction and the case of linking in both directions are also possible.

Through the above steps, a stack of graphene oxide is reduced and stacks of partly reduced graphene are linked to produce linked stacks of partly reduced graphene.

Additionally, partly reduced graphene has the hydroxyl groups on the surface and a nanosubstance such as CNT also has the hydroxyl groups on the surface, so that a stack of graphene oxide and a nanosubstance not subject to self-assemble are occasionally deposited to the surface of partly reduced graphene at the stage of reducing step, and self-assembled with reduced graphene.

The reducing agent is preferably a hydrazine hydrate.

Also, the dispersion solution is preferably heated to a temperature of "the boiling point of water (100° C.)—10° C." or more and less than "the boiling point of water (100° C.)" to then add the reducing agent thereto.

Furthermore, the reducing agent is preferably added to thereafter maintain a heating state at a temperature of "the boiling point of water (100° C.)—10° C." or more and less than "the boiling point of water (100° C.)" under an inert gas atmosphere for 20 hours or more. For example, an oil bath is used for heating and the temperature of the oil bath during reduction is determined at 98° C. as the boiling point of water or less.

These mild reducing conditions allow graphene oxide to be converted into partly reduced graphene, in which only the carbonyl groups are reduced and the carboxyl groups and the hydroxyl groups at an outer edge are left, and a plurality of stacks of partly reduced graphene may be linked so that a plurality of the partly reduced graphene are linked by forming an ester bond through a dehydration condensation reaction between the carboxyl groups of one partly reduced graphene and the hydroxyl groups of another partly reduced graphene.

Thus, a reducing method for leaving the carboxyl groups and the hydroxyl groups at an outer edge is preferable. It is not preferable that strong reduction removes the carboxyl groups and the hydroxyl groups at an outer edge as well.

This method allows a stack of partly reduced graphene, in which graphene is laminated by two sheets to or more and several ten sheets or less, to be arrayed with high density in a crystalline statelike superposing tiles and bricks. A stacked structure three-dimensionally bonded mechanically and electrically allows a material having properties which a material, such that graphene laminated body of approximately ten or so sheets of graphene and a large amount of graphene laminated body are merely mixed, may not offer. Then, a stack of partly reduced graphene laminated by several ten sheets is linked by several ten pieces while maintaining high electrical conductivity on the surface to allow linked stacks of partly reduced graphene having extremely high electrical conductivity to be produced and applied to paper and materials on a practical scale.

Powder comprising linked stacks of partly reduced graphene as an embodiment of the present invention comprises the linked stacks of partly reduced graphene described above. The powder may be powder comprising only linked stacks of partly reduced graphene, or powder to which other materials are added.

Also, a film comprising linked stacks of partly reduced graphene as an embodiment of the present invention comprises the linked stacks of partly reduced graphene described above. The film may be a film comprising only linked stacks of partly reduced graphene, or a film to which other materials are added. These may be easily processed into graphene paper and various shapes of graphene materials. The film comprising only linked stacks of partly reduced graphene may be formed by aggregating a material on filter paper in filtering step. The cross-linking by a crosslinking agent allows a film to which the cross-linking property is added.

The linked stacks of partly reduced graphene 11 as an embodiment of the present invention are linked stacks of partly reduced graphene comprising two or more stacks of partly reduced graphene 21 to 24 linked together, and have a constitution such that the stack of partly reduced graphene 21 has two or more sheets of partly reduced graphene 31 and a nanosubstance 32 held between the sheets of partly reduced graphene 31, the partly reduced graphene 31 has no carbonyl groups and has carboxyl groups 31a and hydroxyl groups 31b, and different stacks of partly reduced graphene 21 to 24 are linked to each other by an ester bond 34; therefore, the property of graphene with a highly conductive surface may be maintained. Even though the thickness is as thick as a carbon atom and the area is ordinarily 5 to 20 μm, graphene may be utilized as a material with high strength and high electrical conductivity without deteriorating high electrical conductivity on the surface of graphene at all.

The linked stack of partly reduced graphene 11 as an embodiment of the present invention have a constitution such that the nanosubstance 32 comprises a conductive material and is a particle, a rod-like body, a cylindrical body or a fibrous body with a diameter of 0.3 nm or more and 100 nm or less; therefore, graphene may be closely bonded mechanically and electrically tightly.

The linked stacks of partly reduced graphene 11 as an embodiment of the present invention have a constitution such that the diameter is 1 to 10 nm; therefore, a structure with a narrow interlayer gap may be obtained.

The linked stacks of partly reduced graphene 11 as an embodiment of the present invention have a constitution such that the nanosubstance 32 is CNT; therefore, graphene may be firmly conjugated and the surface of graphene may maintain high electrical conductivity.

The linked stacks of partly reduced graphene 11 as an embodiment of the present invention have a constitution such that a plurality of the stacks of partly reduced graphene 21 to 24 are linked together in either or both of a parallel direction x and a perpendicular direction z to a sheet plane of the partly reduced graphene; therefore, a structure, in which the plurality of the stacks of partly reduced graphene are closely bonded in either or both of a parallel direction and a perpendicular direction, may be obtained.

The linked stacks of partly reduced graphene 11 as an embodiment of the present invention have a constitution such that a plurality of the stacks of partly reduced graphene 21 to 24 are three-dimensionally linked together; therefore, even though the stacks of partly reduced graphene have a layer structure of two sheets or more and several ten sheets or less, the plurality of the stacks of partly reduced graphene are three-dimensionally superposed to allow a higher-order stacked structure and a layer structure of thousands or more of layers. Also, the stacks of partly reduced graphene may be applied to various industries while combined so as to correspond to a crystal grain of polycrystalline metal and a tile and a brick of a tile and brick structure.

A method for producing linked stacks of partly reduced graphene 11 as an embodiment of the present invention has a constitution comprising step S1 of preparing a dispersion solution in such a manner that graphene oxide having carboxyl groups, hydroxyl groups and carbonyl groups is dispersed into a solvent together with a nanosubstance comprising a conductive material and being a particle, a rod-like body, a cylindrical body or a fibrous body with a diameter of 0.3 nm or more and 100 nm or less, and step S2 of producing linked stacks of partly reduced graphene in such a manner that a reducing agent is added to the dispersion solution under an inert gas atmosphere to convert the graphene oxide into partly reduced graphene, in which only the carbonyl groups are reduced and the carboxyl groups and the hydroxyl groups are left, and link a plurality of the partly reduced graphene together by forming an ester bond through a dehydration condensation reaction between the carboxyl groups of one partly reduced graphene and the hydroxyl groups of another partly reduced graphene; therefore, linked stacks of partly reduced graphene, in which the property of graphene with a highly conductive surface is maintained, may be produced while stacks of partly reduced graphene uniformly dispersed into an aqueous solution may be three-dimensionally linked to each other by ester-bonding chemically functionalized molecules of a graphene outer edge to each other without deteriorating dispersibility in an aqueous solution by going by way of partly reduced graphene.

A stack of graphene oxide is produced by merely mixing an graphene oxide solution and a nanosubstance solution. A stack of graphene oxide, in which graphene oxide is conjugated to each other, is produced by a nanosubstance having a role as a spacer such as to maintain the property of graphene with a highly conductive surface. This step allows graphene oxide and a nanosubstance to be uniformly dispersed into a solvent, allows graphene oxide to be efficiently self-assembled with a nanosubstance, and allows a stack of graphene oxide to be formed in a short time.

Also, a stack of partly reduced graphene is produced while leaving modified carboxyl groups and hydroxyl groups at an outer edge. A stack of graphene oxide and a stack of partly reduced graphene become basic elements for producing a material using graphene. That is to say, graphene oxide is reduced and converted into partly reduced graphene, in which only the carbonyl groups are reduced and the carboxyl groups and the hydroxyl groups are left, in a state of uniformly dispersing a stack of graphene by adding a reducing agent to the above-mentioned dispersion solution under an inert gas atmosphere, and a plurality of the partly reduced graphene is linked by forming an ester bond through a dehydration condensation reaction between the carboxyl groups of one partly reduced graphene and the hydroxyl groups of another partly reduced graphene to allow linked stacks of partly reduced graphene to be easily produced, in which graphene of a nanosubstance such that the thickness is as thick as a carbon atom and the area is ordinarily 5 to 20 µm is applicable as industrial products without deteriorating high electrical conductivity on the surface thereof.

Also, the yield may be improved by a method for producing an assembled body of graphene comprising a method for producing graphene by rebonding graphene to reproduce graphite. Also, a chemical method used individually offers a low cost and is a method such as to allow linked stacks of partly reduced graphene to be mass-produced.

The method for producing linked stacks of partly reduced graphene 11 as an embodiment of the present invention has a constitution such that a surfactant is added to the solvent; therefore, a nanosubstance may be dispersed more uniformly and a stack of graphene oxide may be produced in a shorter time.

The method for producing linked stacks of partly reduced graphene 11 as an embodiment of the present invention has a constitution such that the reducing agent is a hydrazine hydrate; therefore, CNT as a nanosubstance may be dispersed more uniformly and a stack of graphene oxide may be produced in a shorter time.

The method for producing linked stacks of partly reduced graphene 11 as an embodiment of the present invention has a constitution such that the dispersion solution is heated to a temperature of "the boiling point of water (100° C.)—10° C." or more and less than "the boiling point of water (100° C.)" to then add the reducing agent thereto; therefore, graphene oxide may be reduced and converted into partly reduced graphene, in which only the carbonyl groups are reduced and the carboxyl groups and the hydroxyl groups are left. Also, a plurality of the partly reduced graphene may be linked by forming an ester bond through a dehydration condensation reaction between the carboxyl groups of one partly reduced graphene and the hydroxyl groups of another partly reduced graphene.

The method for producing linked stacks of partly reduced graphene 11 as an embodiment of the present invention has a constitution such that the reducing agent is added to thereafter maintain a heating state at a temperature of "the boiling point of water (100° C.)—10° C." or more and less than "the boiling point of water (100° C.)" under an inert gas atmosphere for 20 hours or more; therefore, graphene oxide may be reduced and converted into partly reduced graphene, in which only the carbonyl groups are reduced and the carboxyl groups and the hydroxyl groups are left. Also, a plurality of the partly reduced graphene may be linked by forming an ester bond through a dehydration condensation reaction between the carboxyl groups of one partly reduced graphene and the hydroxyl groups of another partly reduced graphene.

The method for producing linked stacks of partly reduced graphene 11 as an embodiment of the present invention has a constitution such that graphite is mixed into water together with sodium nitrate to then disperse sulfuric acid, potassium permanganate and hydrogen peroxide, and graphene is peeled off from the graphite into graphene oxide, which is thereafter filtered to produce graphene oxide; therefore, graphene oxide may be easily produced at a low cost.

Powder comprising linked stacks of partly reduced graphene as an embodiment of the present invention has a constitution comprising the linked stacks of partly reduced graphene described above; therefore, the powder contains linked stacks of partly reduced graphene obtained by three-dimensionally linking stacks of partly reduced graphene, in which graphene is laminated while maintaining the properties such as high electrical conductivity and high strength on the surface, and may be applied to graphene paper with high strength and large area, various kinds of graphene materials, and a capacitor electrode having strong needs. The powder may be easily processed into a size on the scale of industrial application. The properties of graphene such as high strength and high electrical conductivity may be utilized and the properties and functions of a nanosubstance may be also added.

A film comprising linked stacks of partly reduced graphene as an embodiment of the present invention has a constitution comprising the linked stacks of partly reduced graphene described above; therefore, the film contains linked stacks of partly reduced graphene obtained by three-dimensionally linking stacks of partly reduced graphene, in which graphene is laminated while maintaining the properties such as high electrical conductivity and high strength on the surface, and may be applied to graphene paper with high strength and large area, various kinds of graphene materials, and a capacitor electrode having strong needs. The film may be easily processed into a size on the scale of industrial application. The properties of graphene such as high strength and high electrical conductivity may be utilized and the properties and functions of a nanosubstance may be also added. The film may be utilized as a film mixing linked stacks of reduced graphene and resin, and a composite material in which the film laminated and wound is thermoset, such as a composite material in which pre-preg (sheet-like material such that resin is impregnated into carbon fiber) laminated and wound is thermoset. The film may be utilized for graphene paper with high strength and large area, floor and roof using a film, a large-area transparent conductive flat panel, and a solar cell electrode to allow lighter weight and lower cost.

Linked stacks of partly reduced graphene, a method for producing the same, and powder and film comprising the same as embodiments of the present invention are not limited to the above-mentioned embodiments but may be performed while modified variously within the scope of technical ideas of the present invention. Specific examples of the present embodiments are described by the following examples. However, the present invention is not limited to these examples.

Next, a graphene electrode film, a method for producing the same, and a graphene capacitor as embodiments of the present invention are described while referring to accompanying drawings.

<Graphene Capacitor>

First, a graphene capacitor as an embodiment of the present invention is described.

Figure 11A:
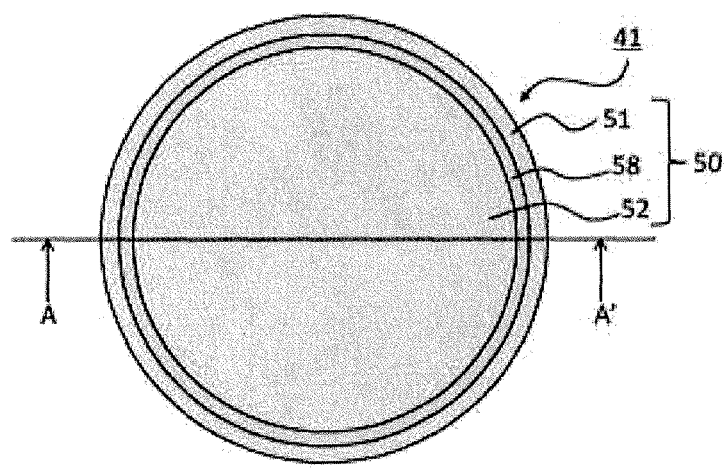
FIG. 11(a) is a plan view showing an example of a graphene capacitor electrode of the present invention.
Figure 11B:
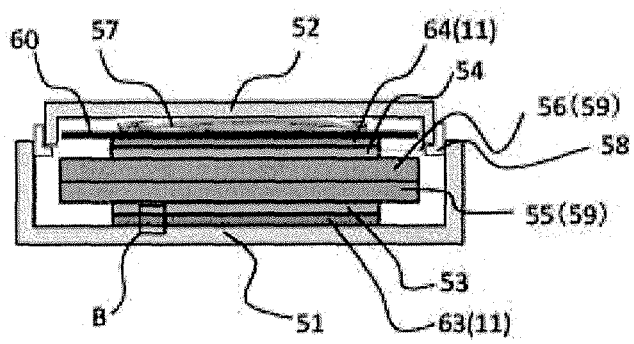
FIG. 11(b) is a cross-sectional view of FIG. 11(a) in A-A' line.

FIGS. 11(a) and 11(b) are views showing an example of a graphene capacitor as an embodiment of the present invention; FIG. 11(a) is a plan view and FIG. 11(b) is a cross-sectional view of FIG. 11(a) in A-A' line.

As shown in FIG. 11(a), a graphene capacitor 41 is circular in a plan view, and comprises a dish-like coin cell case body 51, a gasket 58 and a coin cell cap 52.

The gasket 58 is arranged at the inner circumference of the coin cell case body 51, and the coin cell cap 52 is arranged to obtain a coin-cell type vessel 50 by firmly sticking the periphery.

The inside of the coin-cell type vessel 50 may be sealed and the inside is regarded as a capacitor body part.

The capacitor body part is constituted so that a graphene electrode film 63, a substrate 53, an electrolyte impregnated layer 55, an electrolyte impregnated layer 56, a substrate 54, a graphene electrode film 64, a steel spacer 60 and a spring 57 are laminated in this order.

The substrates 53 and 54 are filter paper, Teflon (registered trademark) films, porous substrates and so on, for example, PTFE membranes. For example, a glass fiber film impregnated with an ionic liquid as an electrolyte is used for the electrolyte impregnated layers 55 and 56. These also serve for a separator 59.

The constitution allows a high-performance electric double layer capacitor while regarding the graphene electrode films 63 and 64 as electrodes.

<Graphene Electrode Film>

Each of the graphene electrode films 63 and 64 comprises linked stacks of partly reduced graphene 11.

Figure 12:
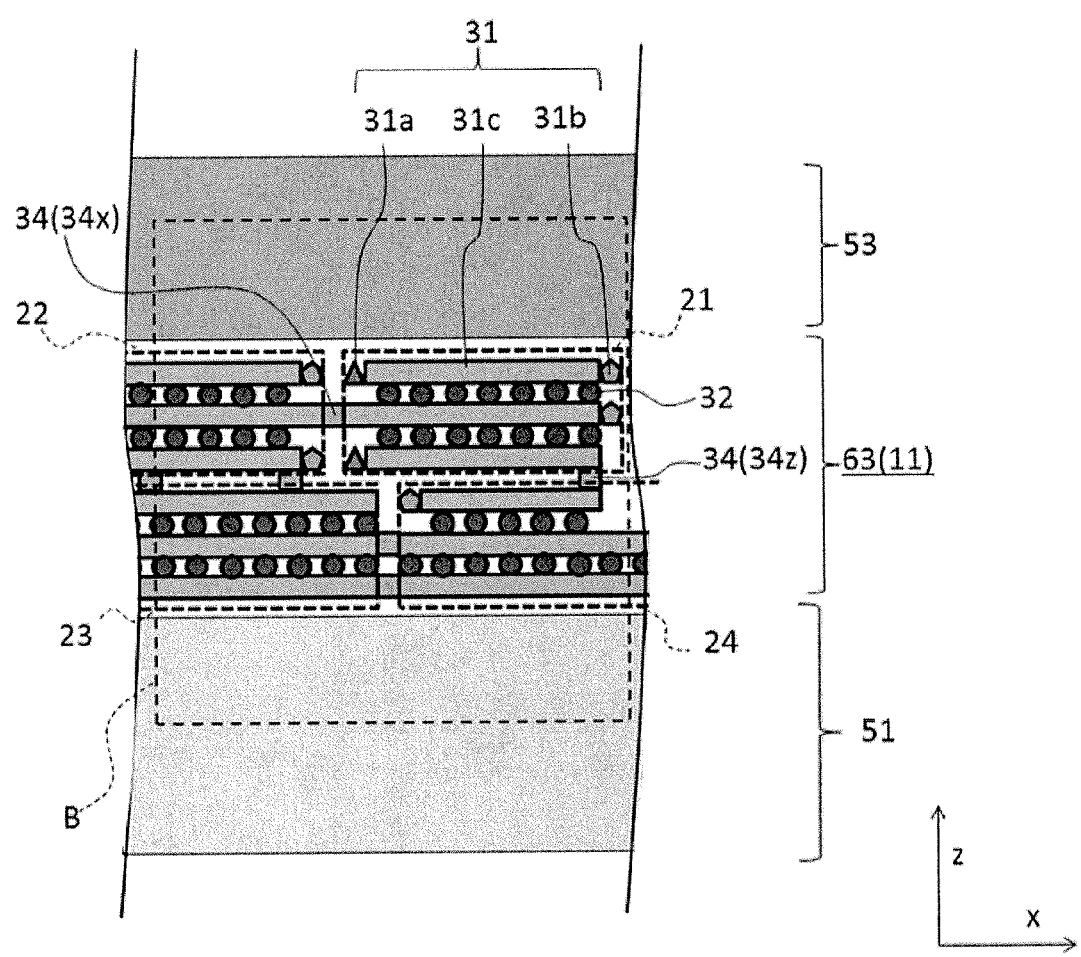
FIG. 12 is a B-part magnified view of FIG. 11(b).

FIG. 12 is a B-part magnified view of FIG. 11(b).

The graphene electrode film 63 is arranged between the substrate 53 and the coin cell case body 51. The graphene electrode film 63 comprises the linked stacks of partly reduced graphene 11.

The linked stacks of partly reduced graphene 11 comprise four stacks of partly reduced graphene 21 to 24 linked by an ester bond 34. Graphene linked in xy plane (illustration is omitted) is superposed in xz plane to form a three-dimensional stacked structure.

Additionally, as omitted in this figure, stacks of partly reduced graphene which are four or more in number are linked on the substrate 53.

The stack of partly reduced graphene 21 is roughly constituted so as to comprise three sheets of partly reduced graphene 31 and a nanosubstance 32 held therebetween.

The constitution of the stack of partly reduced graphene is not limited thereto but may have two or more sheets of partly reduced graphene and a nanosubstance held between the partly reduced graphene.

The nanosubstance 32 comprises a conductive material and is a particulate material, a rod-like body, a cylindrical body or a fibrous body with a diameter of 0.3 nm or more and 100 nm or less. A role as a spacer for not deteriorating high electrical conductivity of the surface of graphene and a role as a linking agent for bonding graphene to each other may be performed by using such a substance.

The diameter is preferably 1 to 10 nm. Thus, the high-density linked stacks of partly reduced graphene 11 may be produced by further narrowing the graphene plane gap.

The nanosubstance is preferably a carbon nanotube (CNT). Thus, the role as a spacer and a linking agent may be improved.

A length of the carbon nanotube is preferably 2 to 5 μm. Thus, the stack of partly reduced graphene 21, in which CNT is uniformly dispersed while improving dispersibility of CNT in an aqueous solution, may be produced. Also, the high-density linked stacks of partly reduced graphene 11 may be produced.

As described above, as shown in FIG. 5, the partly reduced graphene 31 has a graphene body part 31c comprising a single-layer sheet of sp2-bonded carbon atoms, in which a six-membered ring is linked, and carboxyl groups 31a and hydroxyl groups 31b at an outer edge of the graphene body part, namely, at a graphene edge. The partly reduced graphene 31 has the carboxyl groups 31a and the hydroxyl groups 31b on x axis. The partly reduced graphene 31 has one carboxyl group and six hydroxyl groups additionally. The partly reduced graphene 31 has no carbonyl groups.

Figure 6A:
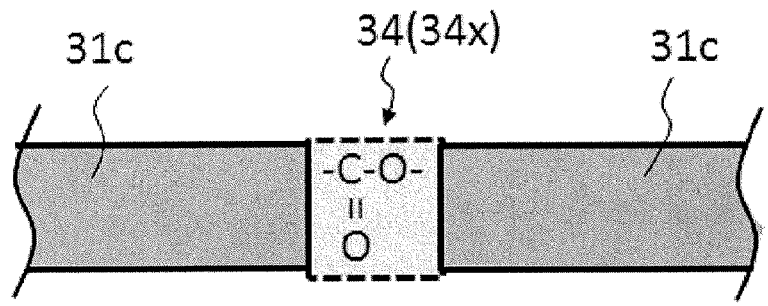
FIG. 6(a) is a view showing an example of an ester bond.
Figure 6B:
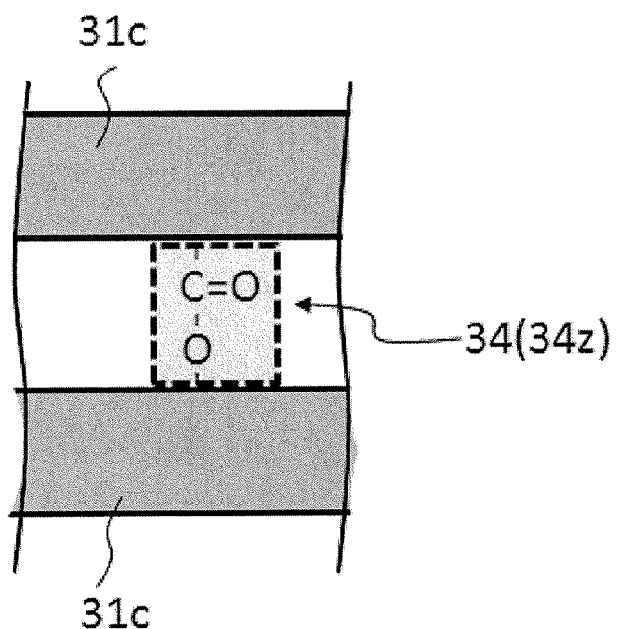
FIG. 6(b) is another view showing an example of an ester bond.

The graphene body parts 31c, as shown in FIGS. 6(a) and 6(b), is linked by ester bonds (—COO—) 34x and 34z. A plurality of the stacks of graphene are preferably linked three-dimensionally by the ester bonds 34x and 34z. Thus, the strength of the structure may be increased and product life as a capacitor may be extended.

The ester bond, as shown in FIG. 7, is formed by a dehydration condensation reaction between two partly reduced graphenes.

<Method for Producing Graphene Electrode Film>

Figure 13:
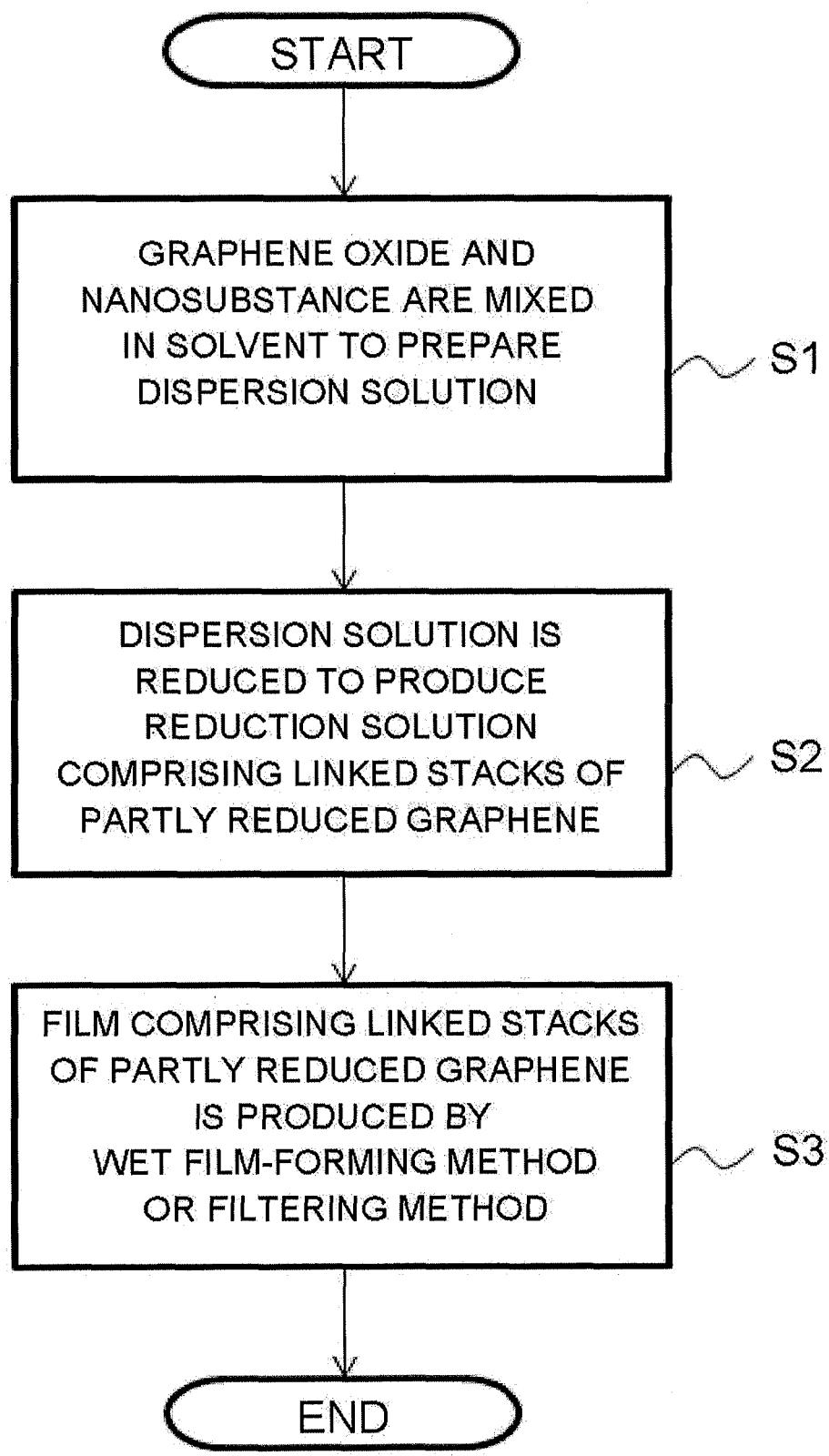
FIG. 13 is a flow chart showing an example of a method for producing linked stacks of partly reduced graphene of the present invention.

FIG. 13 is a flow chart showing an example of a method for producing a graphene electrode film as an embodiment of the present invention.

A method for producing a graphene electrode film as an embodiment of the present invention has dispersion solution preparing step S1, reduction solution producing step S2, and linked stacks of partly reduced graphene film forming step S3.

Graphene oxide is preferably produced in the following manner. The following step is improved on the basis of Hummers method, and graphene oxide may be mass-produced at a low cost. Also, this step to step of producing the electrode film may be regarded as a consistent process.

First, graphite is mixed into water together with sodium nitrate.

Next, sulfuric acid, potassium permanganate and hydrogen peroxide are each added and uniformly dispersed by a predetermined amount. Additionally, they are preferably added in this order and stirred every time they are added.

Next, graphene composing graphite is oxidized by dispersing these well. Graphene oxide may be easily peeled off from graphite into one sheet while having carboxyl groups, hydroxyl groups and carbonyl groups and expanding.

Next, a solution containing graphene oxide is filtered. Thus, powder composed of graphene oxide is obtained. The powder is preferably washed well in water.

[Dispersion Solution Preparing Step S1]

Next, a dispersion solution is prepared in such a manner that graphene oxide having carboxyl groups, hydroxyl groups and carbonyl groups is dispersed into a solvent together with a nanosubstance comprising a conductive material and being a particulate material, a rod-like body, a cylindrical body or a fibrous body with a diameter of 0.3 nm or more and 100 nm or less.

Graphene oxide is in a state of being separated into one sheet in the dispersion solution. This is mixed with a solution in which a nanosubstance is uniformly dispersed, and graphene oxide and a nanosubstance are each dispersed uniformly into one solution. Thus, a nanosubstance is bonded to the graphene oxide surface by π-π bonding. A nanosubstance on the graphene oxide surface is also bonded to another suspended graphene oxide surface and sandwiched. A stack of graphene oxide using a nanosubstance as a spacer is formed by repeating this. Thus, graphene lamination holding a nanosubstance as a spacer therebetween is autonomously formed by repeatedly depositing a nanosubstance deposited to one graphene oxide surface to another graphene oxide surface (hereinafter referred to also as self-assemble), and a stack of graphene oxide, in which graphene oxide is laminated while using a nanosubstance as a spacer and a conjugate, is formed in the dispersion solution. The stack of graphene oxide has a structure of making a nanosubstance intervene as a spacer, and a structure of utilizing exclusive excellent properties such as high electrical conductivity and high strength on the graphene surface.

A surfactant is preferably added to a solvent.

For example, in the case of using a single-walled carbon nanotube as a nanosubstance, sodium dodecylbenzenesulfonate is preferably used as the surfactant.

In the case of using a single-walled carbon nanotube as a nanosubstance, since a single-walled carbon nanotube is hydrophobic, it is difficult to be uniformly dispersed into an aqueous solution. Therefore, it becomes so difficult to form a solution in which hydrophilic graphene oxide and a nanosubstance are uniformly dispersed that it becomes difficult to autonomously form a stack of graphene oxide while making a single-walled carbon nanotube intervene as a spacer between graphenes to be laminated.

Figure 14:
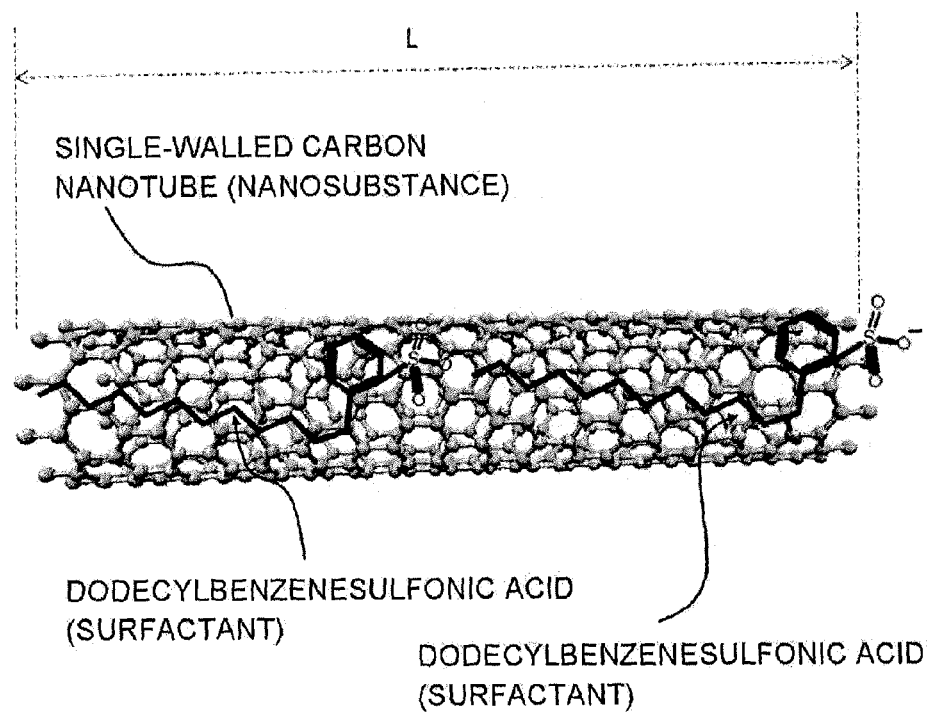
FIG. 14 is a perspective view explaining an example of a state of a nanosubstance and a surfactant held between partly reduced graphenes in the case of using a single-walled carbon nanotube as the nanosubstance and using sodium dodecylbenzenesulfonate as the surfactant.

However, the addition of sodium dodecylbenzenesulfonate as the surfactant to the carbon nanotube solution, as shown in FIG. 14, allows a single-walled carbon nanotube to be ionized while adsorbing dodecylbenzenesulfonic acid ions as surfactant ions on the surface of a single-walled carbon nanotube. Thus, a single-walled carbon nanotube may be easily dispersed uniformly into an aqueous solution by causing Coulomb repulsion to each other.

A length L of the single-walled carbon nanotube 32 is preferably 2 to 5 μm. Thus, dispersibility in an aqueous solution may be improved. Also, linked stacks of partly reduced graphene may be made into high density. The single-walled carbon nanotube is cut into this length by a publicly known method.

Ultrasonic waves are preferably used for dispersing into a solvent. Thus, graphene oxide and a nanosubstance may be each dispersed uniformly into one solution, and thereby efficiently subjected to self-assemble.

[Reduction Solution Producing Step S2]

Next, a reduction solution comprising autonomously three-dimensional linked stacks of partly reduced graphene is produced in such a manner that a reducing agent is added to the dispersion solution under an inert gas atmosphere to convert the graphene oxide into partly reduced graphene, in which only the carbonyl groups are reduced and the carboxyl groups and the hydroxyl groups are left at a graphene edge part, and link a plurality of the partly reduced graphene together mechanically and electrically by forming an ester bond through a dehydration condensation reaction between the carboxyl groups of one partly reduced graphene and the hydroxyl groups of another partly reduced graphene.

Figure 15:
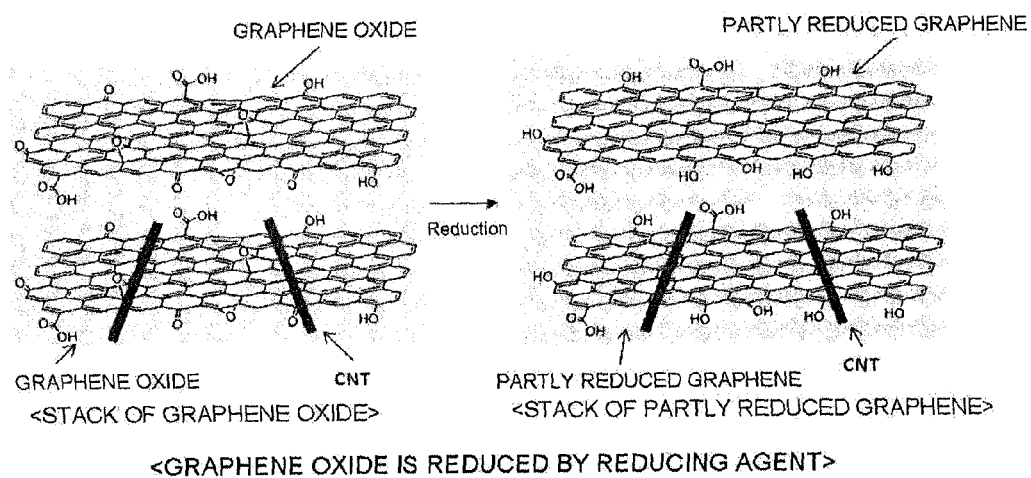
FIG. 15 is a view showing an example of a reduction reaction of a stack of graphene oxide, and a view showing a reaction in which graphene oxide is converted into partly reduced graphene.
Figure 16:
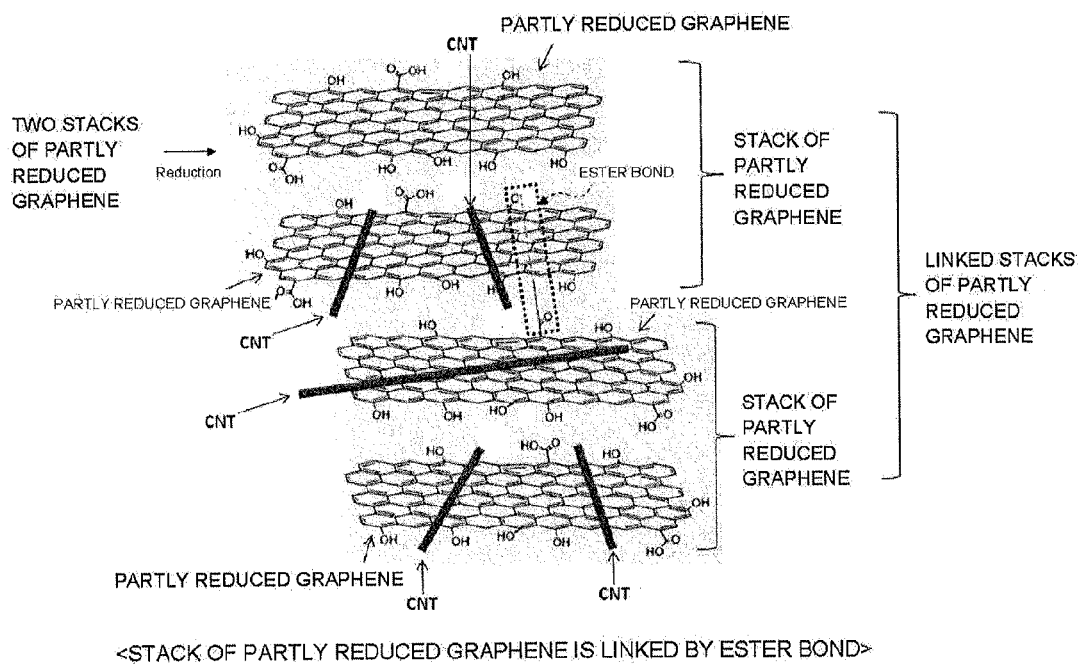
FIG. 16 is a view showing another example of a reduction reaction of a stack of graphene oxide, and a view showing a reaction in which partly reduced graphene is linked to each other by an ester bond.

FIGS. 15 and 16 are views showing an example of a reduction reaction of a stack of graphene oxide.

FIG. 15 is a view showing an example of a reduction reaction of a stack of graphene oxide, and a view showing a reaction in which graphene oxide is converted into partly reduced graphene. Thus, graphene oxide is converted into partly reduced graphene in which only the carbonyl groups are reduced and the carboxyl groups and the hydroxyl groups are left at a graphene edge part.

FIG. 16 is a view showing another example of a reduction reaction of a stack of graphene oxide, and a view showing a reaction in which partly reduced graphene is linked to each other by an ester bond. An example of forming an ester bond at one site is shown, and the case of linking at two or more sites is also possible. Also, an example of linking in z direction is shown, and the case of linking in x direction and the case of linking in both directions are also possible.

Through the above steps, a stack of graphene oxide is reduced and stacks of partly reduced graphene are linked to produce linked stacks of partly reduced graphene.

Additionally, partly reduced graphene has the hydroxyl groups on the surface and a nanosubstance such as a carbon nanotube also has the hydroxyl groups on the surface, so that a stack of graphene oxide and a nanosubstance not subject to self-assemble are occasionally deposited to the surface of partly reduced graphene at the stage of reducing step, and self-assembled with partly reduced graphene.

The reducing agent is preferably a hydrazine hydrate.

Also, the dispersion solution is preferably heated to a temperature of "the boiling point of water (100° C.)—10° C." or more and less than "the boiling point of water (100° C.)" to then add the reducing agent thereto.

Furthermore, the reducing agent is preferably added to thereafter maintain a heating state at a temperature of "the boiling point of water (100° C.)—10° C." or more and less than "the boiling point of water (100° C.)" under an inert gas atmosphere for 20 hours or more.

For example, an oil bath is used for heating and the temperature of the oil bath during reduction is determined at 98° C.

These mild reducing conditions (weak reducing conditions) allow graphene oxide to be converted into partly reduced graphene, in which only the carbonyl groups are reduced and the carboxyl groups (COOH) and the hydroxyl groups (OH) in an edge part are left, and a plurality of stacks of partly reduced graphene may be linked so that a plurality of the partly reduced graphene are linked by forming an ester bond through a dehydration condensation reaction between the carboxyl groups (COOH) of one partly reduced graphene and the hydroxyl groups (OH) of another partly reduced graphene.

Thus, a reducing method for leaving the carboxyl groups (COOH) and the hydroxyl groups (OH) in an edge part is preferable. It is not preferable that strong reduction removes the carboxyl groups (COOH) and the hydroxyl groups (OH) in an edge part as well.

This method allows partly reduced graphene with nano-sized thickness and micro-sized volume to be subject to self-assemble in extremely large amounts without deteriorating the properties thereof, and to become a stack of partly reduced graphene, and by extension linked stacks of partly reduced graphene.

Also, this ester bond is caused in an edge part of partly reduced graphene, so that linked stacks of partly reduced graphene may have a stacked structure arrayed three-dimensionally systematically, such as tiles and bricks joined by cement.

[Linked Stacks of Partly Reduced Graphene Film Forming Step S3]

Next, a film is formed by a wet film-forming method or a filtering method.

Examples of the wet film-forming method include a spin coating method, a dipping method, and a cast method. Also, examples of the filtering method include a method for filtering a reduction solution through filter paper, a membrane and a porous substrate. Vacuum filtration is preferable.

These methods allow a graphene electrode film comprising linked stacks of partly reduced graphene 11 to be easily produced.

After forming a film, washing and drying are preferably repeated plural times. Thus, impurity concentration may be decreased.

The above method allows a stack of partly reduced graphene, in which graphene is laminated by two sheets or more and several ten sheets or less, to be arrayed with high density in a crystalline state so as to superpose like tiles and bricks. A stacked structure three-dimensionally bonded mechanically and electrically allows a material having properties which a material, such that graphene laminated body of approximately ten or so sheets of graphene and a large amount of graphene laminated body are merely mixed, may not offer. Then, a stack of partly reduced graphene laminated by several ten sheets is linked by several ten pieces while maintaining high electrical conductivity on the surface to allow linked stacks of partly reduced graphene having extremely high electrical conductivity to be produced and applied to paper and materials on a practical scale.

The graphene electrode films 63 and 64 as an embodiment of the present invention are graphene electrode films comprising linked stacks of partly reduced graphene 11 in which two or more stacks of partly reduced graphene 21 to 24 are linked together by an ester bond 34, and have a constitution such that the stacks of partly reduced graphene 21 to 24 are stacks in which two or more sheets of partly reduced graphene 31 are laminated and a nanosubstance 32 is held between the lamination layers, and the partly reduced graphene 31 is graphene having carboxyl groups 31$a$ and hydroxyl groups 31$b$ in an edge part; therefore, an electrode film having large power density and energy density and allowing high-speed charge and discharge may be provided and utilized as a high-performance capacitor electrode.

The graphene electrode films 63 and 64 as an embodiment of the present invention have a constitution such that the nanosubstance 32 comprises a conductive material and is a particulate material, a rod-like body, a cylindrical body or a fibrous body with a diameter of 0.3 nm or more and 100 nm or less; therefore, the nanosubstance performs a role as a spacer for not deteriorating high electrical conductivity of the surface of graphene and a role as a linking agent for bonding graphene to each other, and graphene is made into high density by narrowing the graphene plane gap, and an electrode film having so large power density and energy density and allowing high-speed charge and discharge may be provided and utilized as a high-performance capacitor electrode.

The graphene electrode films 63 and 64 as an embodiment of the present invention have a constitution such that the diameter is 1 to 10 nm; therefore, the electrode films may be packed with further high density by narrowing the graphene plane gap. An electrode film having large power density and energy density and allowing high-speed charge and discharge may be provided and utilized as a high-performance capacitor electrode.

The graphene electrode films 63 and 64 as an embodiment of the present invention have a constitution such that the nanosubstance 32 is a carbon nanotube; therefore, the partly reduced graphene is linked without deteriorating electrical conductivity thereof to allow the stacks of partly reduced graphene to be produced, and an electrode film having large power density and energy density and allowing high-speed charge and discharge may be provided and utilized as a high-performance capacitor electrode.

The graphene electrode films 63 and 64 as an embodiment of the present invention have a constitution such that a length of the carbon nanotube is 2 to 5 µm; therefore, a dispersion solution uniformly dispersed may be produced, and the carbon nanotube is uniformly dispersed, and an electrode film having large power density and energy density and allowing high-speed charge and discharge may be provided and utilized as a high-performance capacitor electrode.

The graphene electrode films 63 and 64 as an embodiment of the present invention have a constitution such that the stacks of partly reduced graphene 21 to 24 are three-dimensionally linked together; therefore, a high-strength graphene electrode film with thick film thickness, having large power density and energy density and allowing high-speed charge and discharge, may be provided and utilized as a high-performance capacitor electrode.

The graphene electrode films 63 and 64 as an embodiment of the present invention have a constitution such that a film thickness is 0.1 mm or more; therefore, a high-strength graphene electrode film with thick film thickness, having so large power density and energy density and allowing high-speed charge and discharge, may be provided and utilized as a high-performance capacitor electrode.

A method for producing the graphene electrode films 63 and 64 as an embodiment of the present invention has a constitution comprising step S1 of preparing a dispersion solution in such a manner that powder comprising graphene oxide is dispersed into a solvent together with a nanosubstance comprising a conductive material and being a particulate material, a rod-like body, a cylindrical body or a fibrous body with a diameter of 0.3 nm or more and 100 nm or less, step S2 of producing a reduction solution comprising linked stacks of partly reduced graphene by adding a reducing agent to the dispersion solution under an inert gas atmosphere, and step S3 of producing a graphene electrode film from the reduction solution by a wet film-forming method or a filtering method; therefore, linked stacks of partly reduced graphene may be produced in a short time while efficiently self-assembled, and a graphene electrode film having large power density and energy density and allowing high-speed charge and discharge may be easily produced and utilized as a high-performance capacitor electrode.

In step S2 of producing a reduction solution, graphene oxide is partly reduced so as to remove only the carbonyl groups as chemically functionalized molecules on the surface and leave the carboxyl groups and the hydroxyl groups in an edge part, and partly reduced graphenes are ester-bonded to each other through a dehydration condensation reaction between the carboxyl groups and the hydroxyl groups in an edge part, and linked stacks of partly reduced graphene, in which stacks of partly reduced graphene are three-dimensionalized, may be easily formed by linking graphene and be made into an aggregated body with a size on a practical level.

A method for producing the graphene electrode films 63 and 64 as an embodiment of the present invention has a constitution such that the nanosubstance is a carbon nanotube; therefore, partly reduced graphene is firmly linked and stacks of partly reduced graphene may be formed without deteriorating the electrical conductivity property of the graphene surface, and a graphene electrode film having large power density and energy density and allowing high-speed charge and discharge may be easily produced and utilized as a high-performance capacitor electrode.

A method for producing graphene electrode films 63 and 64 as an embodiment of the present invention has a constitution such that a surfactant is further added to the above-mentioned solvent to prepare the dispersion solution; therefore, linked stacks of partly reduced graphene may be produced while improving uniformity of partly reduced graphene and the nanosubstance, and a graphene electrode film having so large power density and energy density as to allow high-speed charge and discharge may be easily produced and utilized as a high-performance capacitor electrode.

A method for producing the graphene electrode films 63 and 64 as an embodiment of the present invention has a constitution such that sodium dodecylbenzenesulfonate is used as the surfactant, and added by 0.5 to 1.5 wt % to prepare the dispersion solution; therefore, linked stacks of partly reduced graphene may be produced while improving uniformity of partly reduced graphene and a carbon nanotube as the nanosubstance, and a graphene electrode film having large power density and energy density and allowing high-speed charge and discharge may be easily produced and utilized as a high-performance capacitor electrode.

A method for producing the graphene electrode films 63 and 64 as an embodiment of the present invention has a constitution such that the reducing agent is a hydrazine hydrate; therefore, the weak reducing conditions may be used, and graphene oxide may not be reduced completely to graphene but to partly reduced graphene, and the use of this allows linked stacks of partly reduced graphene linked three-dimensionally to be produced, and a graphene electrode film having large power density and energy density and allowing high-speed charge and discharge may be easily produced and utilized as a high-performance capacitor electrode.

A method for producing the graphene electrode films 63 and 64 as an embodiment of the present invention has a constitution such that the dispersion solution is heated to a temperature range of "the boiling point of water (100° C.)—10° C." or more and less than "the boiling point of water (100° C.)" to then add the reducing agent thereto; therefore, the weak reducing conditions may be used, and graphene oxide may not be reduced completely to graphene but to partly reduced graphene, and the use of this allows linked stacks of partly reduced graphene linked three-dimensionally to be produced, and a graphene electrode film having large power density and energy density and allowing high-speed charge and discharge may be easily produced and utilized as a high-performance capacitor electrode.

A method for producing the graphene electrode films 63 and 64 as an embodiment of the present invention has a constitution such that the reducing agent is added to thereafter maintain a heating state at a temperature range of "the boiling point of water (100° C.)—10° C." or more and less than "the boiling point of water (100° C.)" under an inert gas atmosphere for 20 hours or more; therefore, the weak reducing conditions may be used, and graphene oxide may not be reduced completely to graphene but to partly reduced graphene, and the use of this allows linked stacks of partly reduced graphene linked three-dimensionally to be produced, and a graphene electrode film having large power density and energy density and allowing high-speed charge and discharge may be easily produced and utilized as a high-performance capacitor electrode.

A method for producing the graphene electrode films 63 and 64 as an embodiment of the present invention has a constitution such that graphite is mixed into water together with sodium nitrate to then disperse sulfuric acid, potassium permanganate and hydrogen peroxide, and graphene is peeled off from the graphite into graphene oxide, which is thereafter filtered to produce graphene oxide; therefore, a graphene electrode film having large power density and energy density and allowing high-speed charge and discharge may be easily produced at a low cost by a mass-produceable method and utilized as a high-performance capacitor electrode.

A graphene capacitor 41 as an embodiment of the present invention is a capacitor comprising a hermetically sealable vessel 50 and a capacitor body part arranged in the vessel 50, in which the electrolyte impregnated layers 55 and 56 are provided between two sheets of electrode films, and has a constitution such that either of the electrode films is the graphene electrode films 63 and 64; therefore, a graphene electrode film having large power density and energy density and allowing high-speed charge and discharge may be utilized as a capacitor electrode, and a high-performance electric double layer capacitor using graphene as a base and a carbon nanotube as a spacer may be provided.

A graphene electrode film, a method for producing the same, and a graphene capacitor as embodiments of the present invention are not limited to the embodiments but may be performed while modified variously within the scope of technical ideas of the present invention. Specific examples of the present embodiments are described by the following examples. However, the present invention is not limited to these examples.

EXAMPLES

Test Example 1: Production of Graphene Oxide

Figure 17:
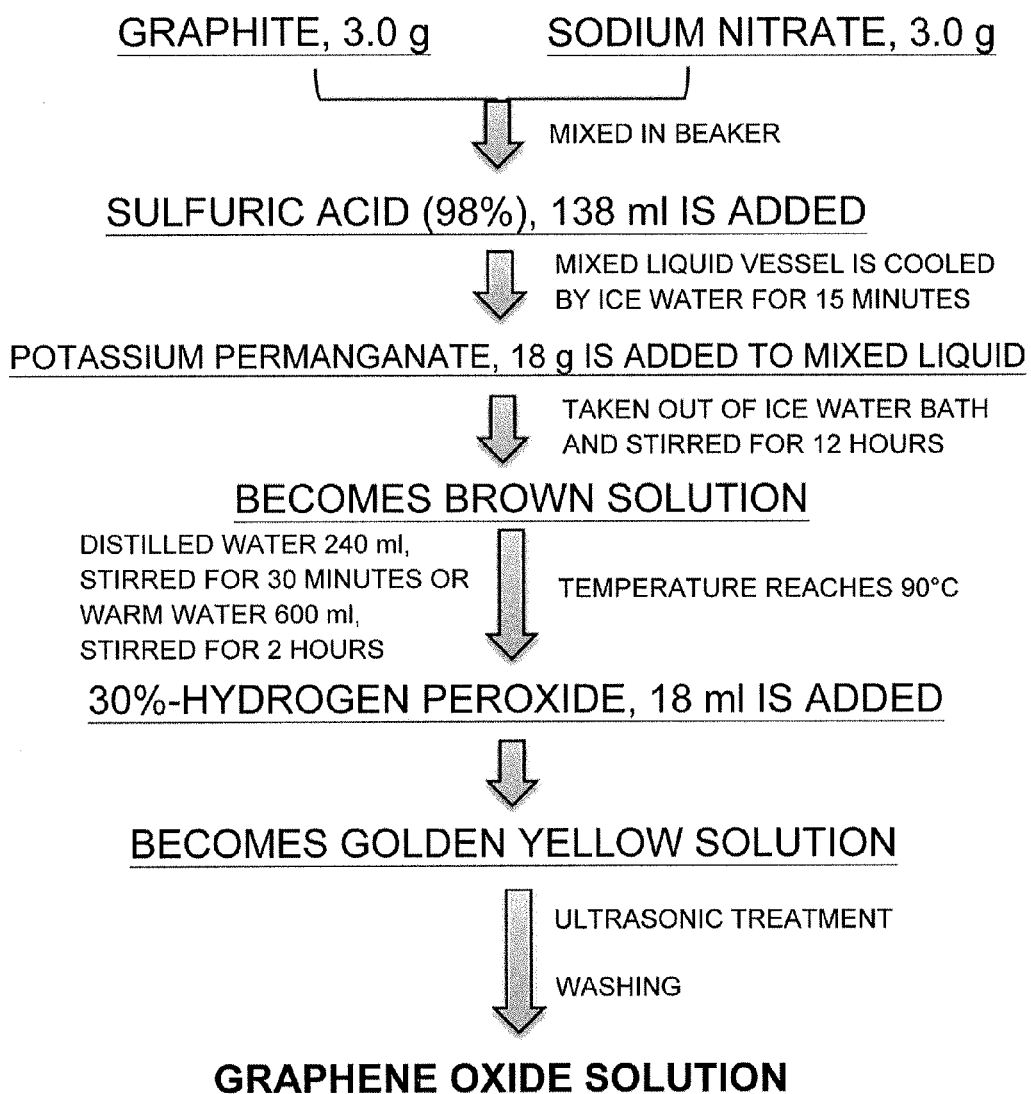
FIG. 17 is a flow chart showing an example of a method for producing graphene oxide.

First, graphene oxide was produced from commercially available graphite in the following manner by using improved Hummers method. FIG. 17 is a flow chart showing an example of a method for producing graphene oxide.

(1) Graphite (3 g, a size of 20 μm or less, a purity of 99%, manufactured by Nacalai Tesque) and 3 g of sodium nitrate ($NaNO_3$) were mixed with water in a beaker.

(2) Sulfuric acid ($H_2SO_4$, 138 ml, a purity of 98%) was added to this mixed liquid and stirred in an ice water bath for 15 minutes.

(3) 18 g of potassium permanganate ($KMnO_4$) was slowly added to this solution so as not to be heated, and strongly stirred at room temperature for 12 hours. After 12 hours, the color of the solution became brown and exhibited a pasty state.

(4) 240 ml of water was added to this solution and stirred for 30 minutes. The temperature of the solution rose to 90° C. In addition, 600 ml of warm water was added thereto and stirred for 2 hours.

(5) 18 ml of 30%-hydrogen peroxide ($H_2O_2$) aqueous solution was slowly added to this solution. Thus, the color of the solution changed from brown to golden yellow. This solution finally obtained was sonicated. In this process, oxide particles of graphite were removed.

(6) Washing was repeated three times while adding 5%-hydrochloric acid (HCl) aqueous solution and 500 ml of deionized water.

(7) Dehydration was repeated by a supercentrifuge and the obtained graphene oxide deposit was vacuum-dried to obtain black powder (graphene oxide).

FIGS. 18(a) and 18(b) are photographs of a sheet of obtained graphene oxide.

FIG. 18(a) is a low-magnification photograph of graphene oxide. Graphene is peeled off from graphite into one sheet and mounted on a substrate in which a carbon thin film is formed on a Cu grid in an approximately elliptic shape in a plan view. FIG. 18(b) is a high-magnification photograph of graphene oxide in the vicinity of a marked part (□ part) of FIG. 18(a). A wrinkled portion is a surface of graphene oxide.

Example 1: Powder of Linked Stacks of Partly Reduced Graphene

Next, linked stacks of partly reduced graphene were produced in the following manner by using the graphene oxide powder obtained in Test Example 1. FIG. 19 is a flow chart showing an example of a method for producing linked stacks of partly reduced graphene.

(1) 100 mg of the graphene oxide produced in Test Example 1 was added to 100 ml of distilled water and dispersed by ultrasonic treatment for 30 minutes to prepare graphene oxide aqueous solution.

(2) 25 mg of a single-walled carbon nanotube (manufactured by Cheap Tubes Inc., a purity of 90%, containing amorphous carbon by 3% or less, a length of 15 to 30 mm, a diameter of 1 to 2 nm) was added to 100 ml of 1%-sodium dodecylbenzenesulfonate aqueous solution and sonicated for 2 hours. Thus, the single-walled carbon nanotube was dispersed to prepare single-walled carbon nanotube aqueous solution.

(3) The graphene oxide aqueous solution and the single-walled carbon nanotube aqueous solution were mixed and sonicated for 1 hour. Thus, an aqueous solution containing an graphene oxide laminated body comprising the single-walled carbon nanotube as a spacer was obtained.

(4) Argon gas was passed through this aqueous solution and retained at 25° C. for 15 minutes. In addition, 24 ml of a hydrazine hydrate was added and retained at 98° C. for 24 hours. Thus, graphene oxide was reduced to partly reduced graphene. Thus, an aqueous solution containing a stack of partly reduced graphene comprising the single-walled carbon nanotube as a spacer was obtained.

Additionally, this reduction of graphene oxide was weakly performed while determining a temperature during the reduction at the boiling point of water or less, whereby carbonyl groups on the surface of graphene oxide were removed but carboxyl groups and hydroxyl groups at an graphene oxide edge were left.

(5) The obtained aqueous solution was filtered to obtain black powder.

(6) The black powder was washed in distilled water. Thus, excessive hydrazine and sodium dodecylbenzenesulfonate were removed.

(7) The black powder was vacuum-dried. Thus, black powder (powder of linked stacks of partly reduced graphene of Example 1) was obtained.

Figure 20A:
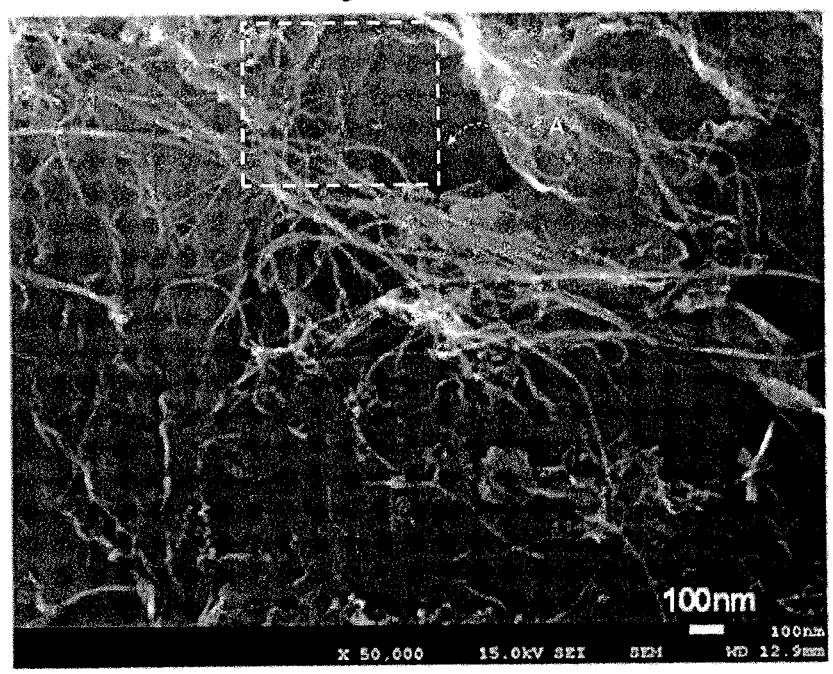
FIG. 20(*a*) is a scanning electron microscope photograph (SEM photograph) of linked stacks of partly reduced graphene of Example 1, magnified by 50000 times.
Figure 20B:
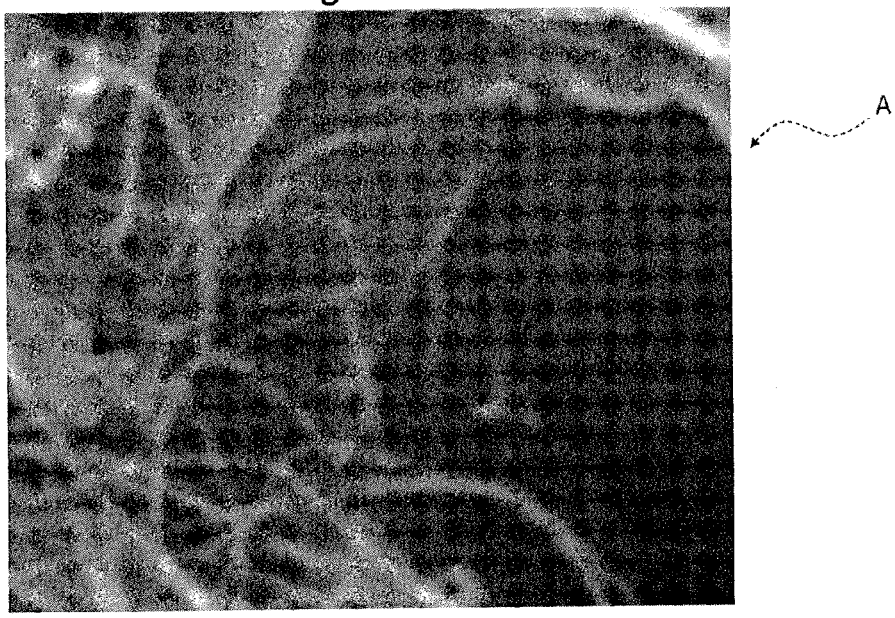

FIGS. 20(a) and 20(b) are scanning electron microscope photographs (SEM photograph) of linked stacks of partly reduced graphene of Example 1. FIG. 20(a) is a photograph magnified by 50000 times and FIG. 20(b) is an A-part magnified view of FIG. 20(a).

Figure 21:
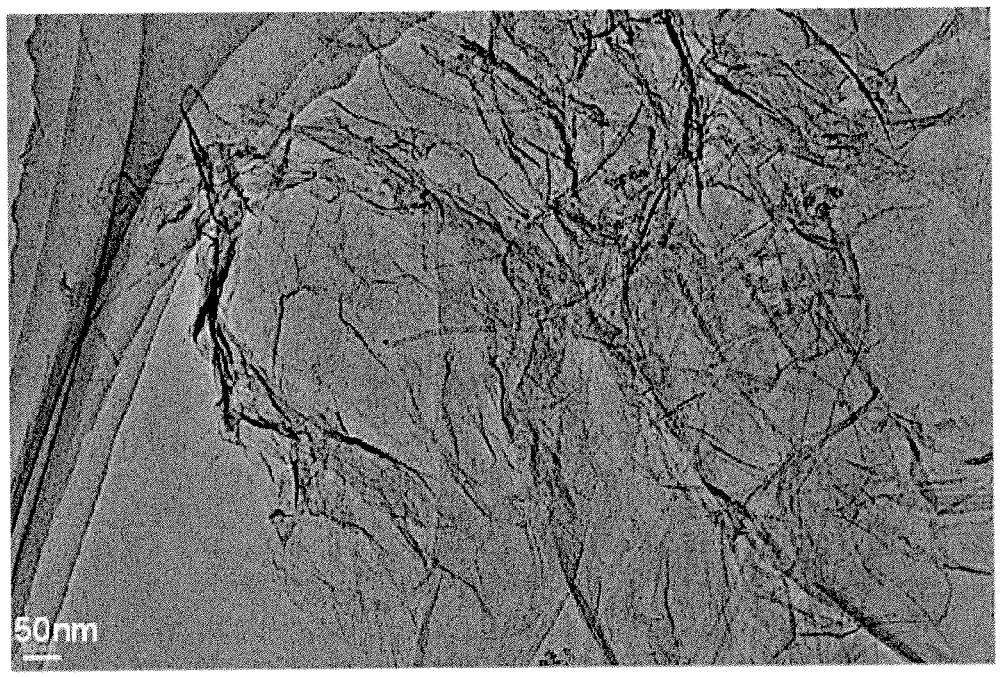
FIG. 21 is a transmission electron microscope photograph (TEM photograph) of linked stacks of partly reduced graphene of Example 1.

FIG. 21 is a transmission electron microscope photograph (TEM photograph) of linked stacks of partly reduced graphene of Example 1.

A single-walled CNT deposited to the graphene surface was observed in FIGS. 20 and 21.

Filmy graphene was formed into a layered state on a substrate. The film was partly turned up. Also, filar CNTs were observed. The CNT was separated from each other and became in a partly bundled state. The CNT existed between the films of graphene. The whole CNT was held between graphenes and the CNT was partly held therebetween.

Figure 22A:
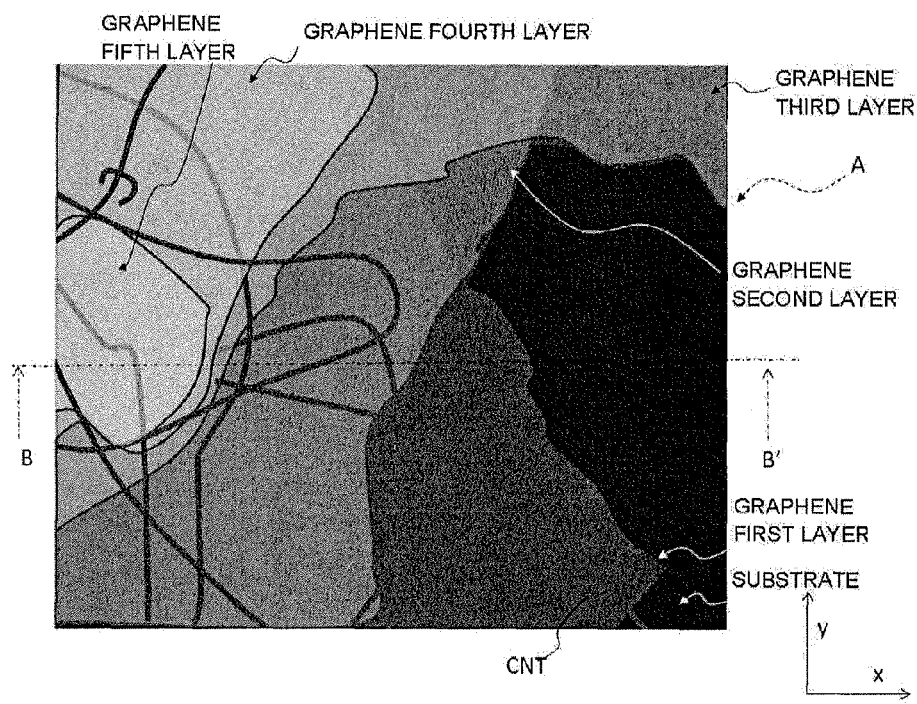
FIG. 22(*a*) is a plan view of A part.
Figure 22B:
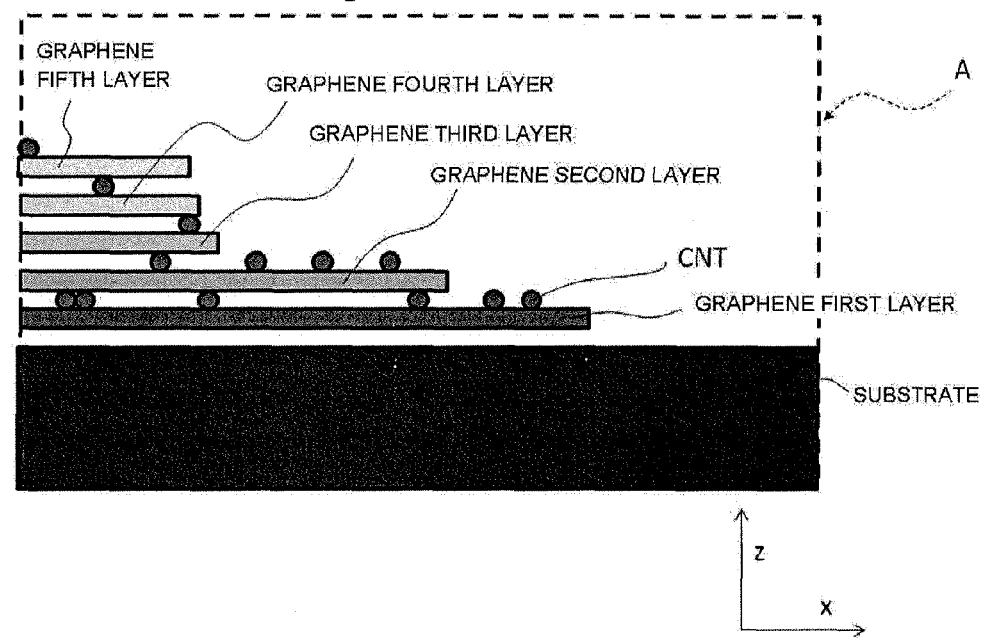

FIGS. 22(a) and 22(b) are schematic views of A part. FIG. 22(a) is a plan view and FIG. 22(b) is a cross-sectional view of FIG. 22(a) in B-B' line.

As shown in FIGS. 22(a) and 22(b), a graphene first layer, a graphene second layer, a graphene third layer, a graphene fourth layer and a graphene fifth layer are laminated on a substrate. Plural fibrous CNTs are conjugated on the surface of graphene and seemingly arranged between the layers.

Figure 23:
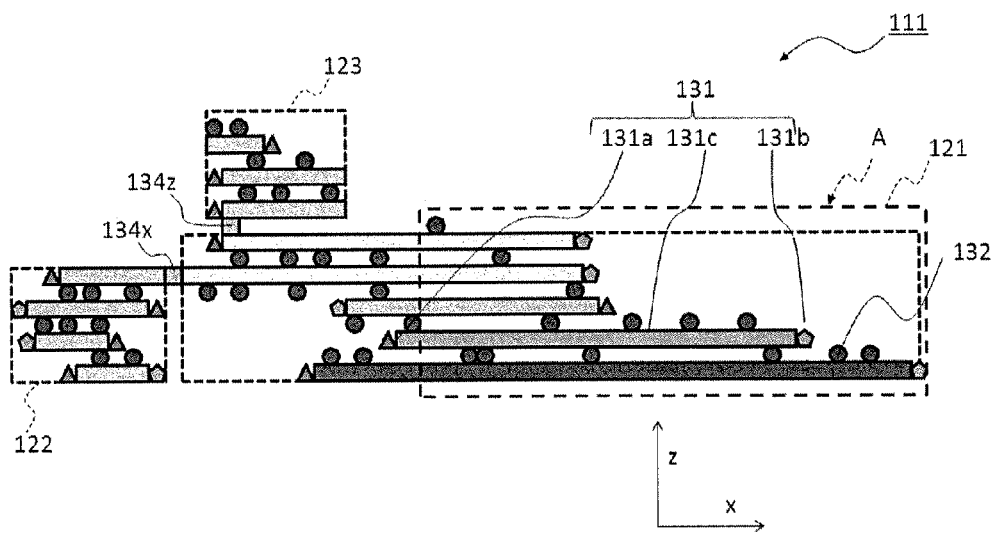
FIG. 23 is a view showing an example of linked stacks of partly reduced graphene based on the schematic view of A part.

FIG. 23 is a view showing an example of linked stacks of partly reduced graphene based on the schematic view of A part.

Linked stacks of partly reduced graphene 111 comprise a stack of partly reduced graphene 121 in which five sheets of partly reduced graphene are laminated, a stack of partly reduced graphene 122 linked to this by an ester bond 134x, and a stack of partly reduced graphene 123 linked thereto by an ester bond 134z. The stack of partly reduced graphene 121 has a partly reduced graphene body part 131c, carboxyl groups 131a and hydroxyl groups 131b.

Example 2: Powder of Linked Stacks of Partly Reduced Graphene

Black powder (powder of linked stacks of partly reduced graphene of Example 2) was obtained in the same manner as Example 1 except for replacing 100 ml of 1%-sodium dodecylbenzenesulfonate aqueous solution with 100 ml of distilled water. This does not contain sodium dodecylbenzenesulfonate unlike Example 1.

Example 3: Film of Linked Stacks of Partly Reduced Graphene

A black film (film of linked stacks of partly reduced graphene of Example 3) was obtained in the same manner as Example 1 except for aggregating the black powder into a filmy state in filtering step.

Example 4: Film of Linked Stacks of Partly Reduced Graphene

A black film (film of linked stacks of partly reduced graphene of Example 4) was obtained in the same manner as Example 2 except for aggregating the black powder into a filmy state in filtering step. This does not contain sodium dodecylbenzenesulfonate.

Example 5: Addition of Sodium Dodecylbenzenesulfonate: Single-Walled Carbon Nanotube: Simultaneous Reduction <Production of Electrode Material>

First, an graphene oxide solution was produced in accordance with the graphene oxide solution production flow shown in FIG. 17, and a solvent was volatilized from the graphene oxide solution to produce graphene oxide powder.

Next, 100 mg of the graphene oxide powder was dispersed into 100 ml of distilled water by ultrasonic treatment for 30 minutes to prepare an graphene oxide solution.

Simultaneously, sodium dodecylbenzenesulfonate was added to a single-walled carbon nanotube by 1 wt % and dissolved in 100 ml of distilled water to prepare a single-walled carbon nanotube solution by ultrasonic treatment for 2 hours. Additionally, the single-walled carbon nanotube was manufactured by Cheap Tubes Inc., such as to have a purity of 90% or more, amorphous carbon of 3 wt % or less, a length of 5 to 30 mm, a diameter of 1 to 2 nm.

Next, 100 ml of the graphene oxide solution and 100 ml of the single-walled carbon nanotube solution were mixed and uniformly dispersed by ultrasonic treatment for 1 hour to obtain a dispersion solution.

Next, 24 ml of a hydrazine hydrate was added to the dispersion solution and retained by using an oil bath at 98° C. for 24 hours. Thus, graphene oxide was reduced to partly reduced graphene and subjected to simultaneous reduction treatment for a dehydration condensation reaction to obtain a reduction solution in which linked stacks of partly reduced graphene, such that stacks of partly reduced graphene obtained by laminating the partly reduced graphene and the single-walled carbon nanotube were ester-bonded, were dispersed.

Next, the reduction solution was vacuum-filtered to obtain a black lump, which was washed in distilled water. These filtration and washing were repeated several times. Thus, remaining hydrazine and sodium dodecylbenzenesulfonate as a surfactant were removed.

Next, the black lump was vacuum-dried (25° C., 48 hours). Thus, black dry powder of aggregate (a material of Example 5) was obtained.

<Production of Electrode Film>

The material of Example 5 was dispersed into ethanol of 0.2 mg/ml and then filtered through a microporous filter to produce an electrode film <4>.

<Production of Coin-Cell Type Experimental Capacitor>

First, the electrode film was cut into a 1.5-cm diameter. The weight of the electrode was 0.8 mg.

Next, this electrode film was stuck on a Teflon (registered trademark) film to obtain a sample electrode.

Figure 24:
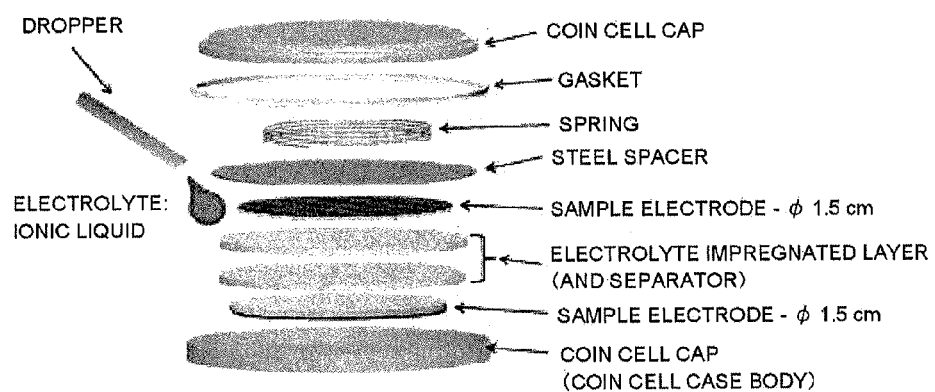
FIG. 24 is an exploded view of a coin-cell type experimental capacitor.

Next, two coin cell caps, a gasket, a spring, a steel spacer, two sheets of sample electrodes (the 1.5 cm-diameter electrode film+the Teflon (registered trademark) film), and two electrolyte impregnated layers (glass fiber films impregnated with electrolyte) were combined by using this sample electrode in accordance with an exploded view of a coin-cell type experimental capacitor shown in FIG. 24 to produce a coin-cell type experimental capacitor of a dual-electrode mode shown in FIGS. 11(a) and 11(b) experimentally. The electrolyte impregnated layers served also as a separator. The constitution of a dual-electrode mode allows exact electrochemical capacitor properties to be measured.

A gap between the sample electrodes was filled with an ionic liquid (1-ethyl-3-methylimidazolium-bis(trifluoromethylsulfonyl)imide, EMI-TFSI) of the electrolyte.

Example 6: No Addition of Sodium Dodecylbenzenesulfonate: Single-Walled Carbon Nanotube: Simultaneous Reduction Dry powder of aggregate (a material of Example 6) was produced in the same manner as Example 5 except for adding no surfactants.

Next, an electrode film <5> was produced in the same manner as Example 5 except for using the material of Example 6 as an electrode material to produce a coin-cell type experimental capacitor.

Example 7: Addition of Sodium Dodecylbenzenesulfonate: Multi-Walled Carbon Nanotube Dry powder of aggregate (a material of Example 7) was produced in the same manner as Example 5 except for replacing a single-walled carbon nanotube with a multi-walled carbon nanotube.

Example 8: Addition of Sodium Dodecylbenzenesulfonate: Cut Single-Walled Carbon Nanotube: Simultaneous Reduction Dry powder of aggregate (a material of Example 8) was produced in the same manner as Example 5 except for cutting a single-walled carbon nanotube into a length of 2 to 5 μm by high-temperature fluorination treatment.

Next, an electrode film <8> was produced in the same manner as Example 5 except for using the material of Example 8 as an electrode material to produce a coin-cell type experimental capacitor.

Comparative Example 1

Graphene oxide was completely reduced to graphene to obtain dry powder of aggregate (a material of Comparative Example 1).

Next, an electrode film <2> was produced in the same manner as Example 5 except for using the material of Comparative Example 1 as an electrode material to produce a coin-cell type experimental capacitor.

Comparative Example 2

Only a single-walled carbon nanotube was regarded as a material of Comparative Example 2.

Next, an electrode film <1> was produced in the same manner as Example 5 except for using the material of Comparative Example 2 as an electrode material to produce a coin-cell type experimental capacitor.

Comparative Example 3

Graphene oxide containing a surfactant was completely reduced to graphene to obtain dry powder of aggregate (a material of Comparative Example 3).

Next, an electrode film <3> was produced in the same manner as Example 5 except for using the material of Comparative Example 3 as an electrode material to produce a coin-cell type experimental capacitor.

Comparative Example 4

Graphene and a carbon nanotube were mixed and regarded as a material of Comparative Example 4.

Next, an electrode film <6> was produced in the same manner as Example 5 except for using the material of Comparative Example 4 as an electrode material to produce a coin-cell type experimental capacitor.

<Observation of Electron Microscope Photograph>

The material of Example 5 and the material of Example 6 were observed with an electron microscope.

Figure 25A:
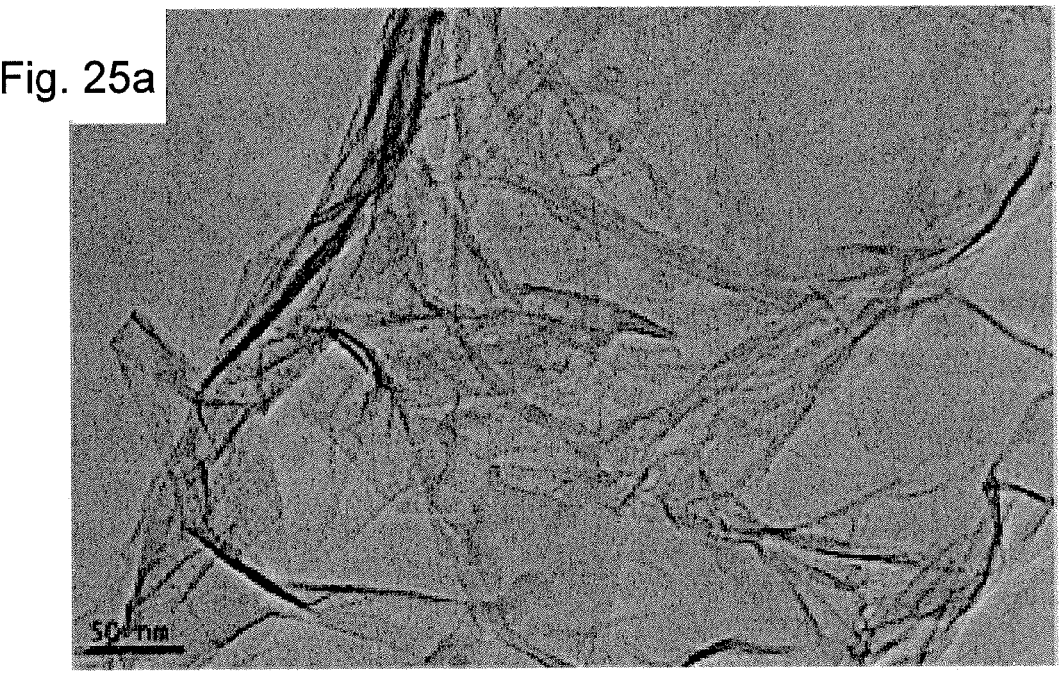
FIG. 25(*a*) is an electron microscope photograph (TEM photograph) of a material of Example 5.
Figure 25B:
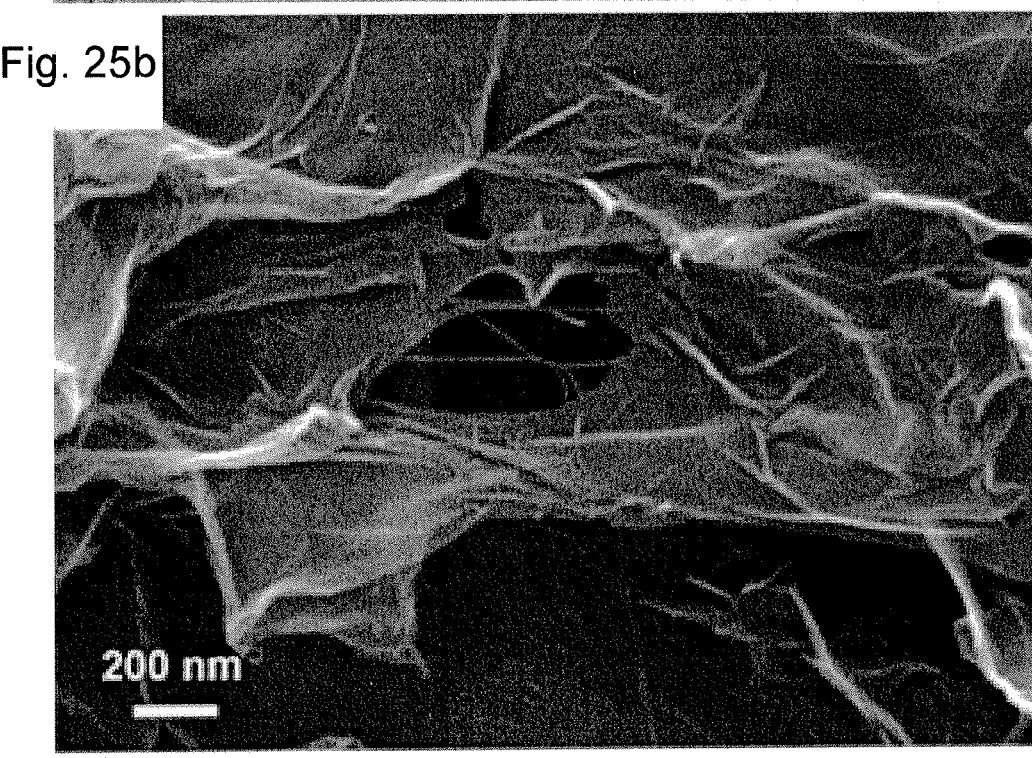

FIGS. 25(a) and 25(b) are electron microscope photographs of the material of Example 5; FIG. 25(a) is a TEM photograph and FIG. 25(b) is an SEM photograph. FIGS. 25(a) and 25(b) are such that a surfactant is added.

Figure 26A:
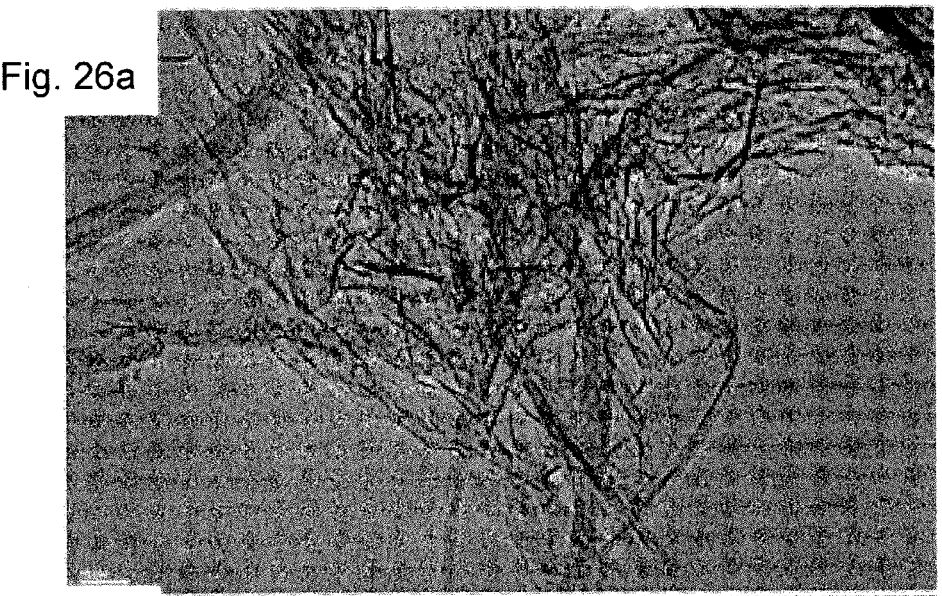
FIG. 26(*a*) is an electron microscope photograph (TEM photograph) of a material of Example 6.
Figure 26B:
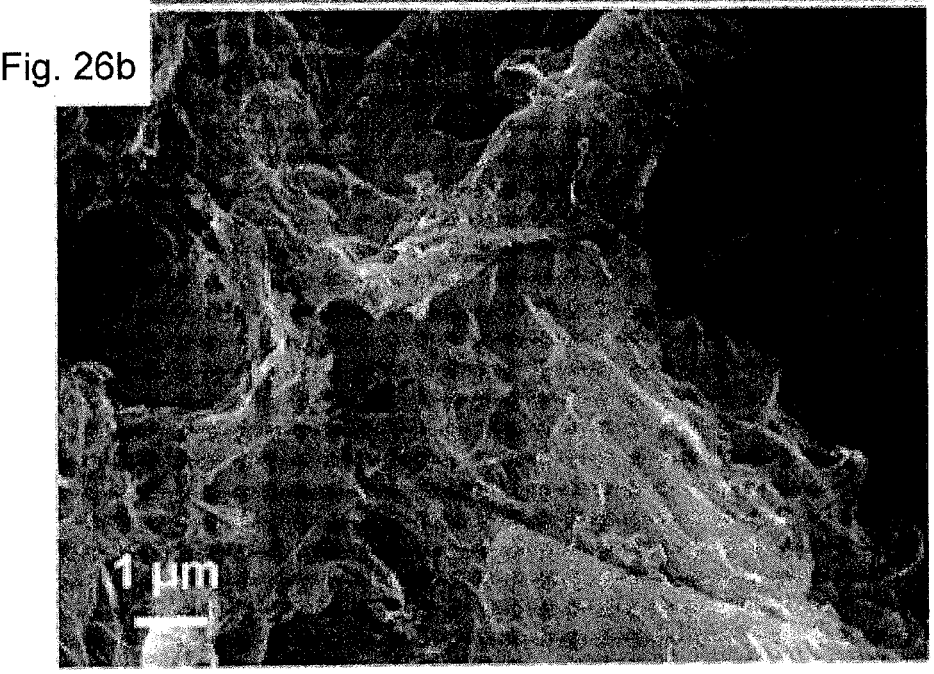

FIGS. 26(a) and 26(b) are electron microscope photographs of the material of Example 6; FIG. 26(a) is a TEM photograph and FIG. 26(b) is an SEM photograph. FIGS. 26(a) and 26(b) are such that a surfactant is not added.

As shown in FIGS. 26(a) and 26(b), in the case of containing no surfactants, a carbon nanotube became a lump and was not uniformly dispersed. On the contrary, as shown in FIGS. 25(a) and 25(b), in the case of containing a surfactant, a carbon nanotube was separated from each other and uniformly dispersed. The effect of uniformly dispersing a carbon nanotube by a surfactant was observed. The carbon nanotube was uniformly dispersed and deposited to graphene comparatively uniformly.

<XRD Evaluation>

An X-ray diffraction pattern of the material of Example 5, the material of Example 7 and the material of Comparative Example 1 was measured.

Figure 27:
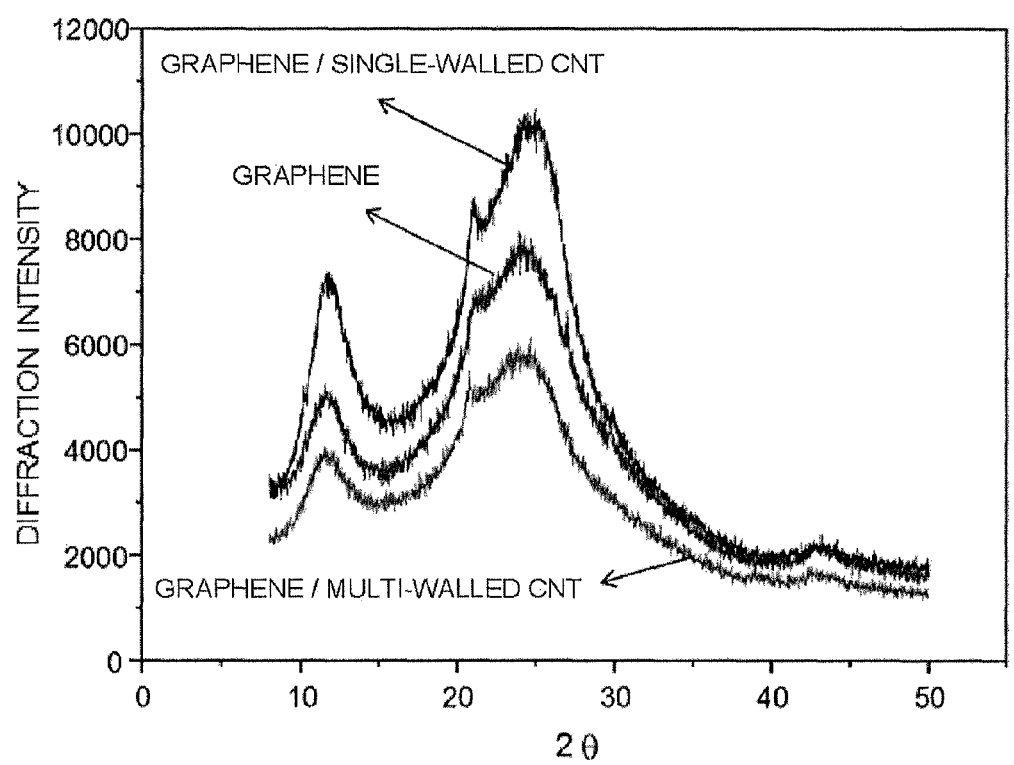
FIG. 27 is a result of measuring an X-ray diffraction pattern of a material of Example 5, a material of Example 7 and a material of Comparative Example 1.

FIG. 27 is a result of measuring an X-ray diffraction pattern of the material of Example 5, the material of Example 7 and the material of Comparative Example 1.

The diffraction intensity of the material of Example 5 (graphene/single-walled carbon nanotube) was higher than that of the material of Example 7 (graphene/multi-walled carbon nanotube) and the material of Comparative Example 1 (graphene), and had an extremely sharp peak and the best crystallinity.

linked stacks of partly reduced graphene in which the graphene and the carbon nanotube had a stacked structure with three-dimensionally high density and high crystallinity.

<Capacitor Performance Measurement>

An electric source was connected to the coin-cell type experimental capacitor produced in Examples 5 and 6 and Comparative Examples 1 to 4, on which voltage was applied to measure capacitor performance of each sample electrode.

FIGS. 28(a) to 28(d) show examples of results of measuring electrochemical properties by a coin-cell type experimental capacitor, and is a charge and discharge curve.

In FIGS. 28(a) to 28(d), "graphene" signifies "the electrode film <2>", "graphene (surfactant) reduction" signifies "the electrode film <3>", "SWNT" signifies "the electrode film <1>", "graphene/SWNT (surfactant) simultaneous reduction" signifies "the electrode film <4>", "graphene/SWNT (surfactant) simultaneous reduction" signifies "the electrode film <4>", "graphene/SWNT simultaneous reduction" signifies "the electrode film <5>", and "graphene/SWNT mixture" signifies "the electrode film <6>". Material names in FIGS. 28(a) to 28(d) correspond to material names in Table 1.

Figure 28A:
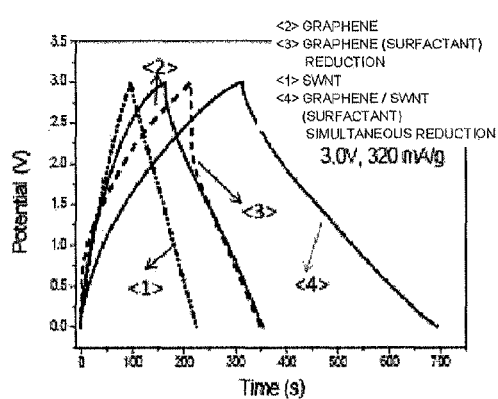
FIG. 28(*a*) shows results of measuring electrochemical properties of various kinds of electrode materials by a coin-cell type experimental capacitor.
Figure 28B:
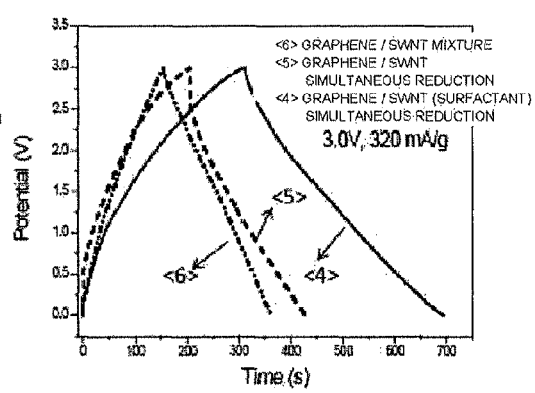

FIGS. 28(a) and (b) are electrochemical properties of various kinds of electrode materials produced for optimizing a stacked structure of graphene and carbon nanotube, and are showing an influence of stacked structure production process.

Figure 28C:
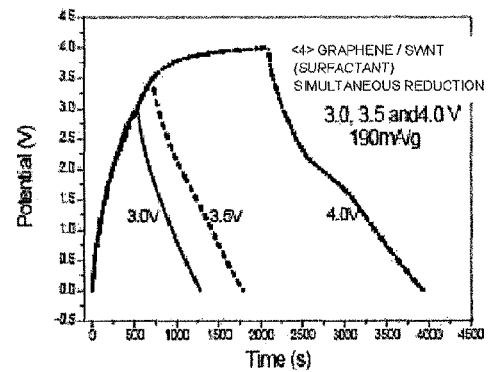

FIGS. 28(c) and (d) are charge and discharge curve and current change when electric potential of a material of the electrode film <4> is increased from 3.0 V to 3.5 V and 4.0 V.

Figure 28D:
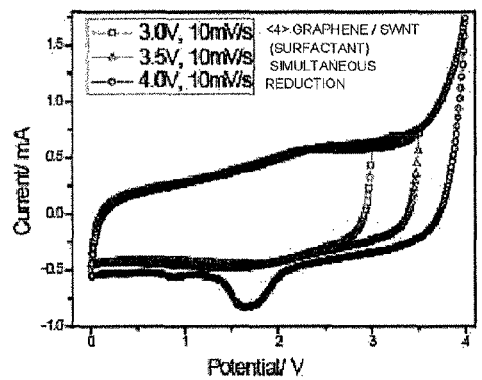

FIG. 28(c) is showing an influence of voltage on electrochemical properties, and FIG. 28(d) is showing a relation between voltage and current. When the electric potential rose from 3.0 V to 3.5 V and 4.0 V, the charge and discharge curve and the current change changed greatly. It is found from this change that energy density increases.

The capacitor properties obtained from these results were gathered in Table 1.

TABLE 1

| MATERIALS | VOLTAGE (V) | CURRENT (mA/g) | CAPACITANCE (F/g) | ENERGY DENSITY (Wh/kg) | POWER DENSITY (kW/kg) |
|---|---|---|---|---|---|
| <1> SINGLE-WALLED CNT | 3.0 | 320 | 55.3 | 16.6 | 171.85 |
| <2> GRAPHENE | 3.0 | 320 | 85.8 | 23.9 | 69.94 |
| <3> GRAPHENE (SURFACTANT) REDUCTION | 3.0 | 320 | 73.6 | 14.2 | 135.38 |
| <4> GRAPHENE/CNT (SURFACTANT) SIMULTANEOUS REDUCTION | 3.0 | 320 | 166.3 | 49.9 | 103.88 |
| <5> GRAPHENE/CNT SIMULTANEOUS REDUCTION | 3.0 | 320 | 110.3 | 25.7 | 69.71 |
| <6> GRAPHENE/CNT MIXTURE | 3.0 | 320 | 90.2 | 27.3 | 89.90 |
| <7> GRAPHENE/CNT (SURFACTANT) SIMULTANEOUS REDUCTION | 3.0 | 190 | 194.6 | 58.0 | 90.34 |
| | 3.5 | 190 | 242.9 | 99.2 | 123.81 |
| | 4.0 | 190 | 364.0 | 194.2 | 163.41 |

This result shows that the single-walled carbon nanotube intervenes uniformly as a spacer between graphenes, and makes graphene interval constant while making graphene lamination into high density.

It was determined from the sample production conditions, the observation of electron microscope photograph and the result of XRD evaluation that the material of Example 5, the material of Example 6 and the material of Example 7 were The capacitor using the electrode film <4> offered the best performance.

In each capacitor using each electrode material of the electrode film <1> to the electrode film <6>, the measurement was performed on the same voltage and current conditions. Additionally, in Table 1, the electrode film <7> as an electrode material is the same electrode film as the electrode film <4>.

The single-walled carbon nanotube electrode comprising the electrode film <1> was so high in electrical conductivity that power density of the capacitor using the electrode film <1> was large. However, energy density was low. In the capacitor using the electrode film <2> and the capacitor using the electrode film <3>, energy density was low. In the capacitor using the electrode film <5> and the capacitor using the electrode film <6>, energy density was somewhat improved and power density was not large. As compared with these capacitors, the capacitor using the electrode film <4> was excellent in capacitance, energy density and power density.

The data of the capacitor using the electrode film <7>, in which a further experiment was performed while raising voltage, reached an energy density of 99 Wh/kg and a power density of 123.8 kW/kg at a voltage of 3.5 V, and a capacitance of 364 F/g, an energy density of 194 Wh/kg and a power density of 163 kW/kg at a load of a voltage of 4.0 V. Such high-performance capacitor properties have not conventionally been recorded.

This value is compared with the measured value of conventional capacitors. The capacitor of Non Patent Literature 4 offered a capacitance of 120 F/g, the capacitor of Non Patent Literature 1 offered a capacitance of 318 F/g and an energy density of 11.1 Wh/kg, the capacitor of Non Patent Literature 3 offered a capacitance of 326.5 F/g, an energy density of 21.7 Wh/kg and a power density of 78.3 kW/kg, and the capacitor of Patent Literature 3 offered a capacitance of 290.6 F/g, an energy density of 62.8 Wh/kg and a power density of 58.5 kW/kg. The capacitor of the present invention offered far high performance as compared with the measured value of conventional capacitors.

It was guessed that the high-performance capacitor properties of the capacitor of the present invention resulted from the use of the electrode material such that graphene and carbon nanotube were made into a three-dimensional stacked structure, with high density and high array.

Additionally, the capacitor of Non Patent Literature 2 was such that polyaniline as a conductive polymer was coated on the electrode while using the oxidation-reduction reaction, and was not used for comparison by reason of not being an ordinary capacitor.

<Capacitor Performance Evaluation of Cut Single-Walled Carbon Nanotube>

When the length of a carbon nanotube is longer than necessary, it is feared that an excessive gap is formed and the carbon nanotube is superposed to become too thick a spacer. Then, in Example 8, a sample in which a single-walled carbon nanotube was cut into a length of 2 to 5 µm was produced to form the electrode film <8> and produce a capacitor.

Capacitor performance of the capacitor using this electrode film <8> was measured.

The capacitor performance was compared with that of the capacitor using the electrode film <4> with the best performance. The results are shown in Table 2. In Table 2, the upper row is the result of measuring the capacitor using the electrode film <8>, and the lower row is the result of measuring the capacitor using the electrode film <4>.

Additionally, the comparison in Table 2 was performed by the samples produced simultaneously in the same process. Thus, the result of Table 2 differed somewhat in numerical value from the result of Table 1. However, the comparison is appropriate for examining the effect of the cut single-walled carbon nanotube.

TABLE 2

| ELECTRODE MATERIALS | ELECTRO-CHEMICAL PROPERTIES MEASUREMENT VOLTAGE | ELECTRO-CHEMICAL PROPERTIES MEASUREMENT CURRENT | CAPACITANCE | ENERGY DENSITY | POWER DENSITY |
|---|---|---|---|---|---|
| GRAPHENE/CUT SINGLE-WALLED CNT SIMULTANEOUS REDUCTION | 3.5 V | 0.5 mA | 155.49 F/kg | 63.15 Wh/kg | 139.63 kW/kg |
| GRAPHENE/SINGLE-WALLED CNT (SURFACTANT) SIMULTANEOUS REDUCTION | 3.5 V | 0. 5 mA | 151.60 F/kg | 61.93 Wh/kg | 175.30 kW/kg |

The performance of the capacitor using the electrode film <8> shown in Table 2 became approximately the same capacitor properties as the capacitor using the electrode film <4> with the best performance in Table 1. This fact shows that the short cutting of the single-walled carbon nanotube allows high performance to be developed even though a surfactant is not used. That is to say, it was guessed that the cut single-walled carbon nanotube offered favorable dispersibility and improved capacitor performance.

INDUSTRIAL APPLICABILITY

Linked stacks of partly reduced graphene of the present invention have a structure such as to directly maintain excellent properties of graphene, such as specific surface area, high strength (high mechanical properties) and high electrical conductivity, and may become a material indispensable to industrial application using graphene. Also, powder and film comprising these linked stacks of partly reduced graphene may be applied to high-strength and high-electrical conductivity graphene paper and structural member utilizing the properties of graphene, transparent high-electrical conductivity and large-area electrodes available for solar cells, high-performance capacitor electrodes, and graphene materials such as pre-preg of a composite material, and brings availability in electron device industry and fuel cell industry. Also, a producing method therefor is such that stacking and linking processes of linked stacks of reduced graphene are incorporated into a process of producing graphene from graphite, and may become fundamental technology indispensable to the application of graphene. Also, the producing method may be made into a collective method for producing powder and film comprising the linked stacks of partly reduced graphene, and may decrease production costs while facilitating the producing method to bring availability in electron device industry and fuel cell industry.

A graphene electrode film and a producing method therefor of the present invention relate to a graphene electrode film with large power density and large energy density, allowing high-speed charge and discharge, and a producing method therefor; a capacitor using this graphene electrode film offers far higher performance than a conventional capacitor using activated carbon powder, and may dramatically improve capacitor performance, such as from 10 Wh/kg to 194 Wh/kg in energy density and from 2.5 kW/kg to 163 kW/kg in power density, and replaces the conventional capacitor and brings applicability in an electric storage device for natural energy with large fluctuation such as solar cells, an auxiliary electric source requiring high power in an emergency, and a capacitor for electric cars, and brings availability in energy device industry and electric storage device industry.

REFERENCE SIGNS LIST

11 . . . linked stacks of partly reduced graphene, 21, 22, 23, 24 . . . stack of partly reduced graphene, 31 . . . partly reduced graphene, 31a . . . carboxyl group, 31b . . . hydroxyl group, 31c . . . partly reduced graphene body part, 32 . . . nanosubstance, 34, 34x, 34z . . . ester bond, 41 . . . graphene capacitor, 50 . . . coin-cell type vessel, 51 . . . coin cell case body, 52 . . . coin cell cap, 53, 54 . . . substrate, 55, 56 . . . electrolyte impregnated layer, 57 . . . spring, 58 . . . gasket, 59 . . . separator, 60 . . . steel spacer, 63, 64 . . . graphene electrode film, 111 . . . linked stacks of reduced graphene, 121, 122, 123 . . . stack of partly reduced graphene, 131 . . . partly reduced graphene, 131a . . . carboxyl group, 131b . . . hydroxyl group, 131c . . . partly reduced graphene body part, 132 . . . nanosubstance, 134x, 134z . . . ester bond

The invention claimed is:

1. Linked stacks of partly reduced graphene comprising two or more stacks of partly reduced graphene linked together;
   wherein the stack of partly reduced graphene has two or more sheets of partly reduced graphene and a nanosubstance held between the sheets of partly reduced graphene;
   the partly reduced graphene has no carbonyl groups and has carboxyl groups and hydroxyl groups; and
   different stacks of partly reduced graphene are linked to each other by an ester bond.

2. The linked stacks of partly reduced graphene according to claim 1, wherein the nanosubstance comprises a conductive material and is a particle, a rod-like body, a cylindrical body or a fibrous body with a diameter of 0.3 nm or more and 100 nm or less.

3. The linked stacks of partly reduced graphene according to claim 2, wherein the diameter is 1 to 10 nm.

4. The linked stacks of partly reduced graphene according to claim 2, wherein the nanosubstance is a carbon nanotube.

5. The linked stacks of partly reduced graphene according to claim 1, wherein a plurality of the stacks of graphene are linked together in either or both of a parallel direction and a perpendicular direction to a sheet plane of the reduced graphene.

6. The linked stacks of partly reduced graphene according to claim 5, wherein the plurality of the stacks of partly reduced graphene are three-dimensionally linked together.

7. A method for producing the linked stacks of partly reduced graphene according to claim 1, comprising:

a step of preparing a dispersion solution in such a manner that graphene oxide having carboxyl groups, hydroxyl groups and carbonyl groups is dispersed into a solvent together with a nanosubstance comprising a conductive material and being a particle, a rod-like body, a cylindrical body or a fibrous body with a diameter of 0.3 nm or more and 100 nm or less; and a step of producing the linked stacks of partly reduced graphene in such a manner that a reducing agent is added to the dispersion solution under an inert gas atmosphere to convert the graphene oxide into partly reduced graphene, in which only the carbonyl groups are reduced and the carboxyl groups and the hydroxyl groups are left, and linking a plurality of the partly reduced graphene together by forming an ester bond through a dehydration condensation reaction between the carboxyl groups of one partly reduced graphene and the hydroxyl groups of another partly reduced graphene.

8. The method for producing the linked stacks of partly reduced graphene according to claim 7, wherein a surfactant is added to the solvent.

9. The method for producing the linked stacks of partly reduced graphene according to claim 7, wherein the reducing agent is a hydrazine hydrate.

10. The method for producing the linked stacks of partly reduced graphene according to claim 7, wherein the dispersion solution is heated to a temperature of 90° C. to less than 100° C. to then add the reducing agent thereto.

11. The method for producing the linked stacks of partly reduced graphene according to claim 10, wherein the reducing agent is added to thereafter maintain a heating state at a temperature of 90° C. to less than 100° C. under an inert gas atmosphere for 20 hours or more.

12. The method for producing the linked stacks of partly reduced graphene according to claim 7, wherein graphite is mixed into water together with sodium nitrate to then disperse sulfuric acid, potassium permanganate and hydrogen peroxide, and graphene is peeled off from the graphite into graphene oxide, which is thereafter filtered to produce graphene oxide.

13. A powder comprising linked stacks of partly reduced graphene comprising the linked stacks of partly reduced graphene according to claim 1.

14. A film comprising linked stacks of partly reduced graphene comprising the linked stacks of partly reduced graphene according to claim 1.

15. A graphene electrode film comprising the linked stacks of partly reduced graphene according to claim 1.

16. The graphene electrode film according to claim 15, wherein the nanosubstance of the linked stacks of partly reduced graphene comprises a conductive material and is a particulate material, a rod-like body, a cylindrical body or a fibrous body with a diameter of 0.3 nm or more and 100 nm or less.

17. The graphene electrode film according to claim 16, wherein the diameter is 1 to 10 nm.

18. The graphene electrode film according to claim 16, wherein the nanosubstance is a carbon nanotube.

19. The graphene electrode film according to claim 18, wherein a length of the carbon nanotube is 2 to 5 μm.

20. The graphene electrode film according to claim 15, wherein the stacks of partly reduced graphene of the linked stacks of partly reduced graphene are three-dimensionally linked together.

21. The graphene electrode film according to claim 15, wherein a film thickness is 0.1 mm or more.

22. A method for producing the graphene electrode film according to claim 15, comprising:

a step of preparing a dispersion solution in such a manner that powder comprising graphene oxide is dispersed into a solvent together with a nanosubstance comprising a conductive material and being a particulate material, a rod-like body, a cylindrical body or a fibrous body with a diameter of 0.3 nm or more and 100 nm or less;

a step of producing a reduction solution comprising the linked stacks of partly reduced graphene by adding a reducing agent to the dispersion solution under an inert gas atmosphere; and a step of producing the graphene electrode film from the reduction solution by a wet film-forming method or a filtering method, wherein:

the linked stacks of partly reduced graphene comprise two or more stacks of partly reduced graphene linked together;

the stack of partly reduced graphene has two or more sheets of partly reduced graphene and the nanosubstance held between the sheets of partly reduced graphene;

the partly reduced graphene has no carbonyl groups and has carboxyl groups and hydroxyl groups; and different stacks of partly reduced graphene are linked to each other by an ester bond.

23. The method for producing the graphene electrode film according to claim 22, wherein the nanosubstance is a carbon nanotube.

24. The method for producing the graphene electrode film according to claim 22, wherein a surfactant is further added to the solvent to prepare the dispersion solution.

25. The method for producing the graphene electrode film according to claim 24, wherein sodium dodecylbenzenesulfonate is used as the surfactant, and added by 0.5 to 1.5 wt % to prepare the dispersion solution.

26. The method for producing the graphene electrode film according to claim 22, wherein the reducing agent is a hydrazine hydrate.

27. The method for producing the graphene electrode film according to claim 22, wherein the dispersion solution is heated to a temperature range of 90° C. to less than 100° C. to then add the reducing agent thereto.

28. The method for producing the graphene electrode film according to claim 27, wherein the reducing agent is added to thereafter maintain a heating state at a temperature range of 90° C. to less than 100° C. under an inert gas atmosphere for 20 hours or more.

29. The method for producing the graphene electrode film according to claim 22, wherein graphite is mixed into water together with sodium nitrate to then disperse sulfuric acid, potassium permanganate and hydrogen peroxide, and graphene is peeled off from the graphite into graphene oxide, which is thereafter filtered to produce graphene oxide.

30. A graphene capacitor comprising a hermetically sealable vessel and a capacitor body part arranged in the vessel, in which an electrolyte impregnated layer is provided between two sheets of electrode films;

wherein each of the electrode films is the graphene electrode film according to claim 15.

* * * * *